United States Patent

Martin et al.

[11] Patent Number: 6,002,099
[45] Date of Patent: Dec. 14, 1999

[54] USER CONTROL INTERFACE FOR LASER SIMULATING SANDBLASTING APPARATUS

[75] Inventors: Clarence H. Martin, Gahanna; Darryl J. Costin, Perrysburg, both of Ohio

[73] Assignee: Technolines, LLC, Toledo, Ohio

[21] Appl. No.: 08/924,389

[22] Filed: Sep. 5, 1997

Related U.S. Application Data

[63] Continuation-in-part of application No. 08/839,165, Apr. 21, 1997.

[51] Int. Cl.$^6$ ................................................ B23K 26/00
[52] U.S. Cl. .............................. 219/121.69; 219/121.68; 364/474.08; 395/107
[58] Field of Search .................... 219/121.6, 121.61, 219/121.68, 121.69, 121.62, 121.83; 364/474.08, 470.02, 470.03, 470.04; 347/251, 252, 253, 254; 395/106, 107; 8/444

[56] References Cited

U.S. PATENT DOCUMENTS 3,720,784  3/1973  Maydan et al. .
5,567,207  10/1996  Lockman et al. .......................... 8/444
5,712,962  1/1998  d'Entremont ........................... 395/107

FOREIGN PATENT DOCUMENTS 2294656  5/1996  United Kingdom .

OTHER PUBLICATIONS

"Micromachining Using Excimer Lasers" by Tonshoff et al., Annals of the CIRP, vol. 42 Jan. 1993, pp. 247–251.

*Primary Examiner*—Geoffrey S. Evans

[57] ABSTRACT

A laser system for processing surfaces of a variety of materials. The amount of laser treatment received by a surface and the geometry are controlled by an impact frequency matrix that is programmed into a control computer. The control computer can control a scanning laser beam to simulate the statistically random property of the particle distribution in a sandblasting process to generate a feathered worn look.

20 Claims, 24 Drawing Sheets

| .6 | .6 | .5 | .4 | .3 | .3 | .2 | .1 | 0 | 0 | 0 | 0 |
| .8 | .8 | .7 | .6 | .5 | .5 | .3 | .2 | .1 | 0 | 0 | 0 |
| 1.0 | 1.0 | 1.0 | 1.0 | .8 | .7 | .6 | .3 | .2 | 0 | 0 | 0 |
| 1.0 | 1.0 | 1.0 | 1.0 | 1.0 | .9 | .8 | .7 | .3 | .1 | 0 | 0 |
| 1.4 | 1.2 | 1.0 | 1.0 | 1.0 | 1.0 | .9 | .8 | .4 | .2 | 0 | 0 |
| 1.6 | 1.4 | 1.2 | 1.0 | 1.0 | 1.0 | .9 | .8 | .4 | .2 | 0 | 0 |
| 1.8 | 1.6 | 1.4 | 1.2 | 1.0 | 1.0 | .9 | .8 | .4 | .2 | 0 | 0 |
| 2.0 | 1.8 | 1.6 | 1.4 | 1.2 | 1.0 | .9 | .8 | .4 | .2 | 0 | 0 |
| 2.0 | 1.8 | 1.6 | 1.4 | 1.2 | 1.0 | .9 | .8 | .4 | .2 | 0 | 0 |
| 1.8 | 1.6 | 1.4 | 1.2 | 1.0 | 1.0 | .9 | .8 | .4 | .2 | 0 | 0 |
| 1.6 | 1.4 | 1.2 | 1.0 | 1.0 | .9 | .8 | .7 | .4 | .2 | 0 | 0 |
| 1.4 | 1.2 | 1.0 | 1.0 | 1.0 | .9 | .8 | .7 | .4 | .2 | 0 | 0 |
| 1.2 | 1.0 | 1.0 | 1.0 | .9 | .9 | .8 | .6 | .4 | .1 | 0 | 0 |
| 1.0 | 1.0 | 1.0 | 1.0 | .9 | .9 | .8 | .6 | .3 | .1 | 0 | 0 |
| 1.0 | 1.0 | 1.0 | .9 | .8 | .7 | .6 | .5 | .3 | .1 | 0 | 0 |
| 1.0 | 1.0 | 1.0 | .9 | .8 | .8 | .6 | .4 | .2 | 0 | 0 | 0 |
| 1.0 | 1.0 | .9 | .8 | .8 | .6 | .4 | .3 | .2 | 0 | 0 | 0 |
| 1.0 | 1.0 | .9 | .8 | .8 | .6 | .4 | .2 | .1 | 0 | 0 | 0 |
| .8 | .8 | .6 | .4 | .4 | .3 | .3 | .2 | 0 | 0 | 0 | 0 |
| .6 | .6 | .4 | .4 | .3 | .3 | .3 | .2 | 0 | 0 | 0 | 0 |
| .3 | .3 | .3 | .2 | .2 | .2 | .1 | 0 | 0 | 0 | 0 | 0 |
| .4 | .4 | .3 | .3 | .2 | .2 | 0 | 0 | 0 | 0 | 0 | 0 |
| .3 | .3 | .2 | .2 | .2 | .1 | 0 | 0 | 0 | 0 | 0 | 0 |
| .9 | .8 | .7 | .4 | .2 | .1 | 0 | 0 | 0 | 0 | 0 | 0 |
| 1.0 | 1.0 | 1.0 | .6 | .4 | .2 | 0 | 0 | 0 | 0 | 0 | 0 |
| 1.8 | 1.6 | 1.0 | .9 | .8 | .2 | 0 | 0 | 0 | 0 | 0 | 0 |
| 2.0 | 1.8 | 1.6 | 1.0 | .8 | −.2 | .1 | 0 | 0 | 0 | 0 | 0 |
| 1.8 | 1.6 | 1.0 | 1.0 | .9 | .3 | .2 | 0 | 0 | 0 | 0 | 0 |
| 1.0 | 1.0 | 1.0 | .80 | .6 | .3 | .2 | 0 | 0 | 0 | 0 | 0 |
| .9 | .8 | .6 | .4 | .3 | .3 | .2 | 0 | 0 | 0 | 0 | 0 |

Probability Density Matrix (X scale factor = 2, Y scale factor = 3)

| 0 | 0 | 0 | .133 | .267 | .133 | 0 | 0 | 0 | 0 |
|---|---|---|---|---|---|---|---|---|---|
| 0 | 0 | 0 | .2 | .4 | .2 | 0 | 0 | 0 | 0 |
| 0 | .067 | .133 | .333 | .533 | .333 | .133 | .067 | 0 | 0 |
| 0 | .133 | .267 | .467 | .667 | .467 | .267 | .133 | 0 | 0 |
| 0 | .2 | .4 | .6 | .8 | .6 | .4 | .2 | 0 | 0 |
| .067 | .267 | .467 | .667 | .867 | .667 | .467 | .267 | .067 | .033 |
| .133 | .333 | .533 | .733 | .933 | .733 | .533 | .333 | .133 | .067 |
| .2 | .4 | .6 | .8 | 1.0 | .8 | .6 | .4 | .2 | .1 |
| .133 | .333 | .533 | .733 | .933 | .733 | .533 | .333 | .133 | .067 |
| .067 | .267 | .467 | .667 | .867 | .667 | .467 | .267 | .067 | .033 |
| 0 | .2 | .4 | .6 | .8 | .6 | .4 | .2 | 0 | 0 |
| 0 | .133 | .267 | .467 | .667 | .467 | .267 | .133 | 0 | 0 |
| 0 | .067 | .133 | .333 | .533 | .333 | .133 | .067 | 0 | 0 |
| 0 | 0 | 0 | .2 | .4 | .2 | 0 | 0 | 0 | 0 |
| 0 | 0 | 0 | .133 | .267 | .133 | 0 | 0 | 0 | 0 |

FIGURE 13B

Impact Frequency Matrix (Single Pass)

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 1 | 0 | 0 | 0 | 0 | 0 |
| 0 | 0 | 1 | 0 | 1 | 1 | 1 | 0 | 0 | 0 |
| 0 | 1 | 1 | 0 | 1 | 0 | 0 | 0 | 0 | 0 |
| 0 | 0 | 1 | 1 | 1 | 0 | 1 | 0 | 0 | 0 |
| 0 | 0 | 1 | 1 | 1 | 1 | 0 | 1 | 0 | 0 |
| 0 | 1 | 0 | 1 | 1 | 1 | 1 | 0 | 0 | 1 |
| 1 | 0 | 0 | 1 | 1 | 1 | 1 | 1 | 0 | 0 |
| 0 | 0 | 1 | 0 | 1 | 1 | 1 | 0 | 0 | 0 |
| 0 | 0 | 0 | 1 | 1 | 1 | 1 | 0 | 0 | 0 |
| 0 | 0 | 0 | 1 | 1 | 0 | 0 | 0 | 0 | 0 |
| 0 | 0 | 0 | 1 | 0 | 1 | 0 | 0 | 0 | 0 |
| 0 | 0 | 0 | 0 | 0 | 0 | 0 | 0 | 0 | 0 |
| 0 | 0 | 0 | 0 | 0 | 1 | 0 | 0 | 0 | 0 |

FIGURE 13C

Impact Frequency Matrix (Double Pass)

| | | | | | | | | | |
|---|---|---|---|---|---|---|---|---|---|
| 0 | 0 | 0 | 0 | 1 | 0 | 0 | 0 | 0 | 0 |
| 0 | 0 | 0 | 0 | 1 | 0 | 0 | 0 | 0 | 0 |
| 0 | 0 | 0 | 1 | 2 | 1 | 0 | 0 | 0 | 0 |
| 0 | 0 | 1 | 1 | 2 | 2 | 1 | 0 | 0 | 0 |
| 0 | 1 | 1 | 1 | 1 | 1 | 1 | 0 | 0 | 0 |
| 0 | 1 | 1 | 2 | 2 | 1 | 1 | 1 | 0 | 0 |
| 0 | 1 | 1 | 2 | 2 | 1 | 1 | 1 | 0 | 0 |
| 0 | 1 | 1 | 2 | 2 | 2 | 2 | 1 | 0 | 1 |
| 1 | 1 | 1 | 2 | 2 | 2 | 1 | 1 | 1 | 0 |
| 0 | 1 | 1 | 1 | 2 | 1 | 2 | 1 | 0 | 0 |
| 0 | 0 | 1 | 1 | 2 | 2 | 1 | 0 | 0 | 0 |
| 0 | 0 | 1 | 1 | 2 | 1 | 1 | 0 | 0 | 0 |
| 0 | 0 | 0 | 1 | 1 | 1 | 0 | 0 | 0 | 0 |
| 0 | 0 | 0 | 0 | 0 | 1 | 1 | 0 | 0 | 0 |
| 0 | 0 | 0 | 0 | 0 | 1 | 0 | 0 | 0 | 0 |

FIGURE 13D

USER CONTROL INTERFACE FOR LASER SIMULATING SANDBLASTING APPARATUS

CROSS-REFERENCE TO RELATED APPLICATIONS

This application is a continuation-in-part of the U.S. patent application Ser. No. 08/839,165, filed on Apr. 21, 1997, the disclosure of which is incorporated herein by reference.

FIELD OF THE INVENTION

The invention relates to a surface treatment with a laser, and more specifically, to a system and method for processing surfaces made of a variety of materials with at least one laser beam.

BACKGROUND OF THE INVENTION

A laser beam can interact with a surface in a number of ways to change the surface properties, including light absorption, photon scattering and impact. For example, a surface may be burned by an intense laser beam. Some surface particles may be ablated from a surface by the impact of a laser beam. Therefore, a surface can be treated with one or more proper lasers to achieve certain effects that may not be easily done with other methods.

One example is described in a copending U.S. patent application Ser. No. 08/729,493, pending, titled "LASER METHOD OF SCRIBING GRAPHICS", which is a continuation-in-part of the U.S. patent application Ser. No. 08/550,339, filed on Oct. 30, 1995 by the present inventors. The disclosure of the application "LASER METHOD OF SCRIBING GRAPHICS" is incorporated herein by reference. This application describes the use of lasers to form graphics on various materials by controlling the energy density per unit time. The graphics can be patterns, images, letters, and or any other visual marks.

Although other traditional methods, such as dyeing, printing, weaving, embossing and stamping, have been widely used, laser methods appear to have certain advantages in producing complex and intricate graphics on the materials. This is at least in part because many of the traditional methods lack the necessary registration and precision to insure that minute details of the graphics are accurately and repeatably presented on the materials. In addition, laser methods obviate many problems associated with the traditional methods such as high cost of equipment manufacturing, equipment maintenance, and operation, and environmental problems. A detailed description of laser methods for scribing graphics is disclosed by the present inventors in the above-referenced U.S. Patent Application "LASER METHOD OF SCRIBING GRAPHICS".

The extent of laser interaction with a material can be characterized by a number of parameters, including spot size, intensity, power, etc. The inventors found that one preferred parameter is the energy density per unit time ("EDPUT") defined as $$EDPUT = \frac{laser\ power}{beam\ spot\ area} \cdot \frac{1}{projection\ speed},$$

wherein the projection speed is the speed at which the scanning beam spot moves on a treated surface. The laser operational parameters, i.e., laser power, beam spot size, and the scanning speed, should be adjusted to achieve an optimal EDPUT for a specific material and a particular scribing requirement. If the EDPUT is too high, the surface may be carbonized, burned or melted; if the EDPUT is too low, the effect of laser treatment may not be sufficiently visible.

The inventors recognized that lasers can also be used to treat a material surface in order to achieve a certain texture or appearance of the surface. Many materials used by the fabric industry are treated for this purpose.

Denim fabrics may undergo a sandblasting process to obtain a worn look. Denim jeans are often sold with a worn look in the upper knee portions and back seat portion. The effect is similar to a feathered or shadowed look in which the degree of the worn look continuously changes along the length and width of the seemingly "worn" areas.

A sandblast treatment conventionally abrades the jeans with sand particles, metal particles or other materials at selected areas to impart a worn look with a desired degree of wear. This process blasts sand particles from a sandblasting device to a pair of jeans. The random spatial distribution of the sand creates a unique appearance in a treated area. Denim jeans and other clothing treated with such a sandblast process have been very popular in the consumer market.

However, the sandblast process has a number of problems and limitations. For example, the process of blasting sand or other abrasive particles presents significant environmental issues. A worker usually needs to wear protective gear and masks to reduce the impact of inhaling any airborne sand or other abrasive particles that are used. The actual blasting process typically occurs in a room which is shielded from other areas in a manufacturing facility. Further environmental issues arise with the clean-up and disposal of the sand. In practice, undesired sand is rarely completely eliminated from the pockets of the denim jeans or jackets.

The sandblasting process is an abrasive process, which causes wear to the sandblasting equipment. Typically, the actual equipment needs to be replaced as often as after one year of normal operation. This can result in added capital expense and installation.

In addition, the actual cost of the sandblasting process is estimated as high as several dollars per unit garment depending upon capacity utilization. This high cost is at least in part due to the labor involved, the cost of the equipment repair or continual purchase, the environmental clean-up required, the sand used, and actual yield of the goods.

Furthermore, the sandblasting process can adversely affect the strength and durability of the finished goods due to the abrasion of the sand or other particles that are used.

Despite the above problems and limitations, the sandblast process is still in wide use simply because there is no other alternative technique that can economically produce the desired surface appearance of the sandblast treatment. In view of the above, the inventors found it desirable to replace the sandblast process with a new environmentally friendly process which is capable of producing the "sandblast look", while reducing the cost and maintaining the durability of the finished goods.

In recognition of the above, the inventors invented laser scribing methods to achieve the worn look on fabrics such as denim, the details of which are disclosed in the above incorporated U.S. Patent Application "LASER METHOD OF SCRIBING GRAPHICS". For example, one method is to drape the denim over a cone, cup or wedge surface that is positioned relative to a laser with a beam scanning device so that the focused beam projects different spot sizes at the different location of the surfaces due to a distance variation from the focusing distance. Thus, the beam intensity changes with the beam location on the surface. Accordingly, the degree of laser scribing or the EDPUT on a piece of fabric on the surface changes. The laser sweeps over the surface to scribe a predetermined pattern such as a solid pattern or a pattern with closely spaced lines. The locations on the surface that are closest to the focusing distance to the laser receive the highest beam intensity or EDPUT and hence have the more worn appearance. Conversely, the locations on the surface that are most out of the focusing distance experience the lowest beam intensity or EDPUT and hence have the least worn appearance. This technique has the effect of continuously changing the laser focus as the laser beam scribes a pattern on the material. Alternatively, the laser focus can be changed with respect to a flat work surface to achieve the same effect.

Another method previously disclosed by the inventors relies upon using a reference EDPUT grid over a treated area. Again, a pattern is scribed in the treated area on a material surface. However, the operating parameters of the scanning laser are changed along the grid with a predetermined EDPUT distribution to achieve a desired effect, such as a feathered look.

A third method uses a pattern having a series of lines with continuously increasing or decreasing line spacing and thickness to achieve the feathered or worn look. Alternatively, a radial gradient pattern can also be created by the scanning laser with predetermined EDPUTs to produce a desired fabric appearance.

The results of the above laser scribing techniques produced a "feathered" look that approximates the worn look achieved from the sandblast process. However, the treated fabric does not exactly replicate the well-recognized worn appearance produced by the sandblast process. This is at least in part due to the fact that the laser scribing techniques are essentially based on scribing with a regular pattern rather than the spatially random hits of the blasted sand or other abrasive particles. Also, the above laser methods usually have long processing cycle times. For example, a typical cycle time of 6 minutes or more is needed to process an oval section of 21 inches in length.

Another limitation is that laser scribing requires a certain pattern with certain laser operating parameters (e.g., EDPUT) for a particular fabric in order to create a worn look. Since this can change from one fabric to another, the methods are very material specific and are not universally applicable to different fabrics.

SUMMARY OF THE INVENTION

The present invention uses a laser surface-processing system to simulate the worn look on a fabric surface produced by a sandblast process in an economic way.

This is accomplished, at least in part, by forming a random computer simulation of the appearance of a sandblasted fabric and using at least one laser beam to mark the material in the shape of the sandblasted fabric.

According to one embodiment of the invention, the laser system comprises: a laser system that produces a laser beam of a predetermined amount of output energy range which scans over a surface of a material to mark a user-defined pattern thereon in response to an applied command; a controller having a microprocessor and a memory unit and communicating with said laser system to generate said applied command according to a respective laser impact frequency information indicative of said user-defined pattern; and a user control interface having a user input device and a display to produce a graphic representation of said user-defined pattern based on said laser impact frequency information.

One aspect of the invention is a capability of displaying the surface appearance prior to actual processing a surface with the laser.

Another aspect of the invention is user modification of the laser impact frequency information prior to actual processing. This may be achieved by changing parameters of a pattern density matrix, a probability density matrix or a impact frequency matrix that determines the laser control codes.

BRIEF DESCRIPTION OF THE DRAWINGS

These and other aspects and advantages of the present invention will become more apparent in light of the following detailed description, as illustrated in the accompanying drawings, in which:

FIG. 5B is a computer generated laser processed elliptical pattern using the same impact frequency matrix as in FIG. 5A with two laser scans according to the invention.

FIGS. 6A and 6B show computer simulated elliptical patterns with the impact frequency matrix of different roll-off rates in accordance with the invention.

FIG. 7B is a density matrix indicating the right-hand-side portion of the worn pattern of FIG. 7A.

FIG. 8B is a density matrix indicating the right-hand-side portion of the worn pattern of FIG. 8A.

FIG. 13B shows a probability density matrix based on the pattern density matrix of Table 1.

FIGS. 13C and 13D are the impact frequency matrices based on the pattern density matrix of Table 1 with a single pass and a double pass, respectively.

DETAILED DESCRIPTION OF THE INVENTION

Figure 1:
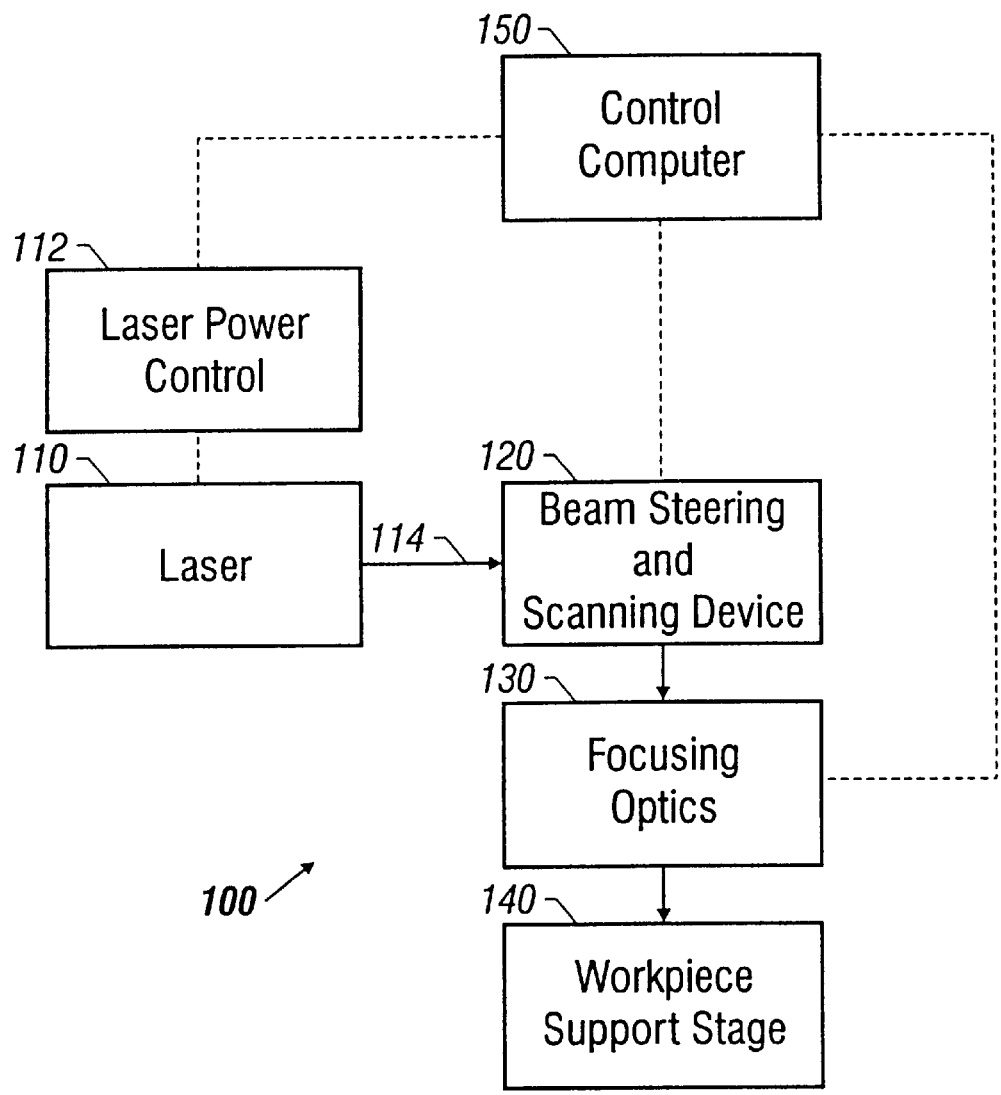
FIG. 1 is a block diagram showing a laser processing system for treating a surface of a workpiece in accordance with one embodiment of the invention.

FIG. 1 shows a block diagram of a laser processing system for treating a surface. Solid lines with an arrow represent laser beams and dashed lines represent electrical control signals. A laser 110 of any type, including but not limited to, a gas laser and a solid-state laser in continuous-wave ("CW") or pulsed operation mode, produces a laser beam 114. A $CO_2$ laser may be preferred for processing many materials. The output power of the beam 114 is controlled by a laser power control unit 112. A beam steering and scanning device 120 is positioned relative to the laser 110 and is operable to guide the laser beam to any location on a workpiece surface held by a support stage 140. Focusing optics 130 is located at a desired distance from the support stage 140 relative to the beam steering and scanning device 120. Alternatively, the workpiece could be moved relative to the beam.

A control computer 150 is used to control the operation of the laser 110 including the output power, the steering and scanning of the laser beam, and the beam spot size on the support stage by changing the distance between the focusing optics 130 and the support stage 140. The control of the output power of the laser 110 includes turning on/off the laser beam, changing the output level, or other controls. Such a control can be done either by directly controlling the laser itself or by modulating the output beam with a electrically-driven beam shutter and beam attenuator. Many aspects of these components are described in the above-referenced copending application "LASER METHOD OF SCRIBING GRAPHICS" but these alternatively can be controlled using the techniques disclosed in U.S. Pat. No. 5,567,207 to Lockman et al., "Method for marking and fading textiles with lasers", which is incorporated herein by reference.

The beam steering and scanning device 120 can either direct the beam to any desired location on the support stage 140 or scan the beam over the support stage with a certain spatial sequence at a desired speed. Thus, the system 100 in general can be used for scribing a pattern on a surface and treating a surface to achieve a certain appearance or achieving a combination of the both.

One parameter for measuring the degree of laser interaction with a surface is the energy density per unit time ("EDPUT") as defined previously and as described in the above-referenced patent application, "LASER METHOD OF SCRIBING GRAPHICS". The EDPUT at the support stage can be determined by at least one of the following: the laser power control 112, the beam steering and scanning device 120 for the projection speed of the beam on the support stage 140, or the focusing optics 130 which changes the beam spot size. Therefore, a desired EDPUT distribution with a certain spatial profile can be achieved. This results in either scribing a graphic on a workpiece or producing a certain surface appearance. The computer 150 may have a plurality of programs for controlling the system 100 to achieve these functions, which will be described in detail.

A variety of materials can be processed with the system 100, including but not limited to, fabrics, leathers, vinyls, rubber, wood, metals, plastics, ceramics, glass, and other materials. These materials can be used to make different goods. Some common examples include clothing, linens, footwear, belts, purses and wallets, luggage, vehicle interiors, furniture coverings, and wall coverings.

Figure 2:
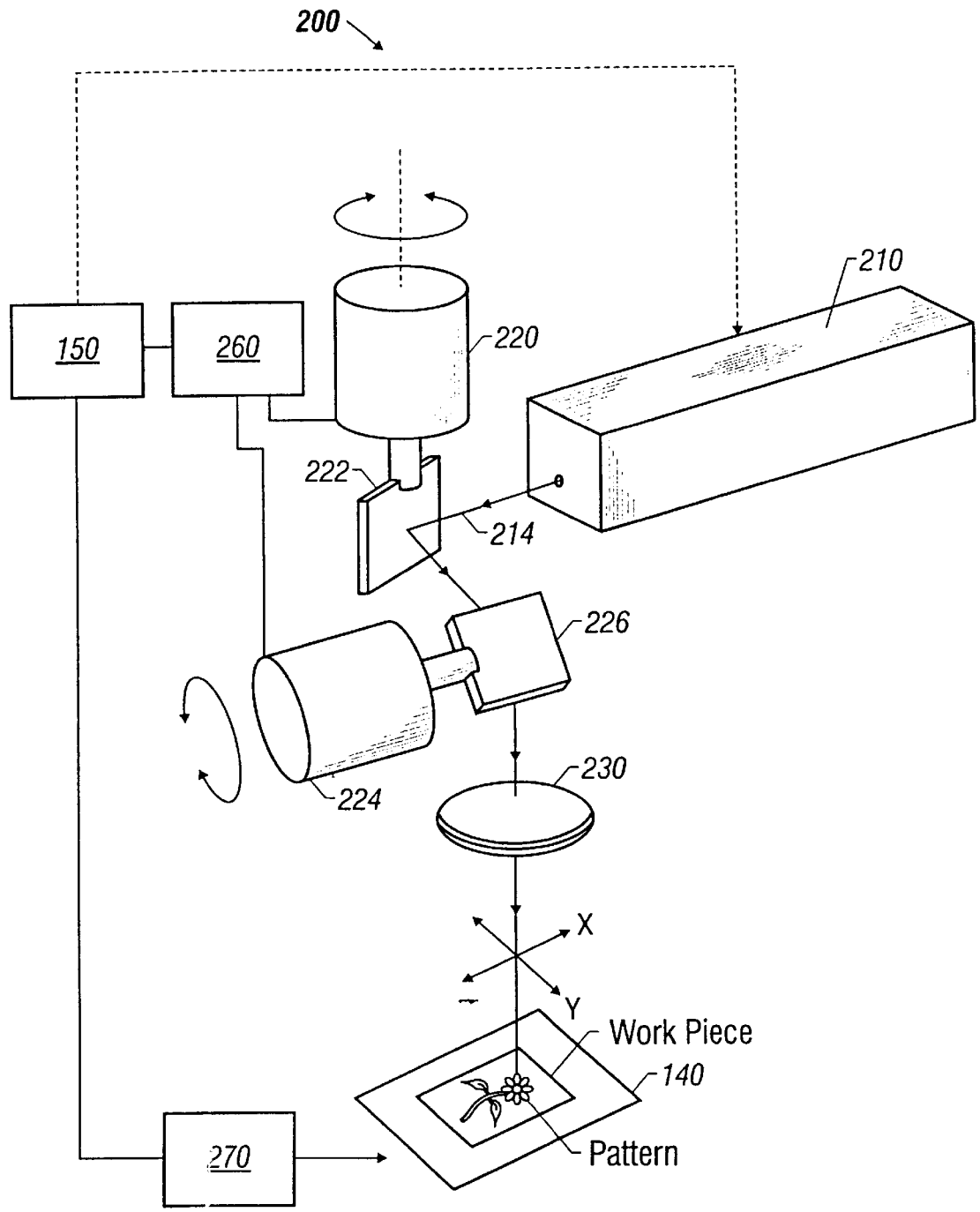
FIG. 2 shows an exemplary embodiment of the system of FIG. 1 with two galvo mirrors for scanning the laser beam on a workpiece surface.

FIG. 2 shows an exemplary implementation 200 of the system 100. A laser 210, which can be various lasers including $CO_2$ laser or a YAG laser, produces different power outputs. An electrically controlled beam shutter (not shown) is included in the laser 210 to turn the beam on and off as desired. A CW $CO_2$ laser, "Stylus", manufactured by Excel/Control Laser (Orlando, Fla.) may be used as the laser 210.

The laser 210 generates a laser beam 214 in the direction of a computer controlled beam steering and scanning device having a first mirror 222 and a second mirror 226. The mirror 226 is mounted on a first galvanometer 220 so that the mirror 226 can be rotated to move the beam in a x-axis on the support stage 140. A second galvanometer 224 is used to control the mirror 226 so that the mirror 226 can move the beam on the support stage 140 along a y-axis. Therefore, galvo mirrors 222 and 226 can be controlled to scan the laser beam on the support stage to generate almost any trace and geometric shapes as desired. A galvanometer driver 260 receives commands including numerical control commands from the computer 150 and respectively controls the movement of each galvo mirror.

The laser beam 214 is deflected first by the x-axis mirror 222 and subsequently by the y-axis mirror 226 to direct the beam through a focusing lens 230. The lens 230 is preferably a multi-element, flat-field, focusing lens assembly, which is capable of optically maintaining the focused spot on a flat plane as the laser beam moves across the material. A movable stage (not shown) may be used to hold the lens 230 so that the distance between the lens 230 and the support stage 140 can be changed to alter the beam spot size. Alternatively, the support stage may be moved relative to the lens 230.

The support stage 140 has a working surface which can be almost any substrate including a table, or even a gaseous fluidized bed. A workpiece is placed on the working surface. Usually the laser beam is directed generally perpendicular to the surface of the support stage 140, but it may be desirable to guide the beam to the surface with an angle to achieve certain effects. For example, the incident angle may range between about 45° and about 135°.

The computer 150 may include a designated computer such as a workstation computer (not shown) to facilitate the formation of the desired graphic or a control matrix. For example, a graphic can be scanned into the workstation computer and converted into the proper format. This may expedite the processing speed. The computer 150 then controls the galvo mirrors to impart the desired pattern to a material at the appropriate EDPUT.

The system 200 may also include a gas tank 270 to inject a gas such as an inert gas into the working zone over the support stage 140. The amount of gas can be controlled by the computer 150. This use of an inert gas may reduce the tendency for complete carbonization, burn-through and/or melting. This technique can also produce new effects in graphics. In general, any gas can be used in the working zone to create a new effect. The gas tank 270 can also be used to inject a gaseous dye to add coloring on the workpiece.

The above disclosed laser systems can be used to impart graphics and/or produce certain surface appearance on a surface of a variety of goods and products. In particular, the systems can be used to treat fabrics to have the worn appearance produced by the conventional sandblasting process. The present invention has a number of advantages over the conventional sandblast process. For example, the overall cost for the system hardware and operation maintenance is less expensive. The health hazards and environmental problems of the sandblasting process are essentially eliminated. The present invention can better preserve the durability of the treated materials than the sandblasting process. The product yield of the system of the invention is higher than that of the sandblasting process due to the accuracy and repeatability of the laser processing. In addition, the present invention not only can generate the sandblasted look on denim but also can impart the sandblasted look on khaki and other materials. Furthermore, precision control of the laser beam allows the system of the invention to better control how a selected area will be treated while the sandblasting process simply cannot give a user much control. Yet another advantage of the invention is that laser surface treatment for a desired appearance can be easily combined with scribing complex and intricate graphics in the treated area with the same processing system without relying on additional devices.

A first embodiment of the invention uses the computer 150 of the preferred system 100 in FIG. 1 to produce a probability density matrix which is in turn used to create a impact frequency matrix. The impact frequency matrix is used to control the laser in producing a desired two-dimensional spatial profile or pattern. A selected area to be treated on a fabric or clothing is divided into a matrix of pixels. The impact frequency matrix indicates the number of times each individual pixel is "hit" by the laser beam.

The computer 150 uses the impact frequency matrix to generate a set of control codes for controlling the laser power control 112 and the beam steering and scanning device 120. The power control 112 keeps the laser beam 114 "on" as the beam scans locations on a fabric corresponding to pixels with positive impact frequencies and turns the laser beam "off" as the laser scans locations with zero impact frequencies.

Thus the laser beam 114 is turned on and off as it scans through a treated area of a desired geometric shape on a fabric. Multiple laser scans are needed at the locations that are to be hit by the beam more than once. Areas of a fabric having locations that are hit more frequently by the laser beam have a high degree of worn appearance. Conversely, the areas having locations that are hit by the laser beam less frequently will have a lesser degree of worn appearance. The final effect of the scan is equivalent to shining many laser beams simultaneously on the fabric with a random distribution similar to the blasting of sand particles. For this reason, this laser surface treatment may be referred as a "laser blast" process which is analogous to the "sandblast".

The probability density matrix assigns a probability density to each pixel. This assignment of probabilities may be done mathematically for any number of regular geometric shapes, e.g., ellipses, rectangles, etc. Alternatively, the assignment of probabilities may be set manually and stored in a data file. Thus, a probability density matrix for a selected geometric pattern is predictable and definite. If the probability density matrix is directly used to generate control codes of the processing laser, the resultant pattern will have a predictable and definite appearance or a "contrived" look. This cannot produce the random feature of a sandblast pattern.

The random aspect of the sandblast pattern is preferably accomplished by the means of impact frequency matrix. The impact frequency matrix is based on the probability density matrix in the sense that the spatial distribution of the probability density remains the same in the impact frequency matrix. However, the impact frequency at each location is also determined by a random number produced by a pseudo-random number generated with a computer (e.g., the control computer 150 in FIG. 1). This aspect of the invention enables the impact frequency matrix to simulate the random features of a sandblast pattern. The computer-generated random numbers are based on an initial random number seed. Using different initial random number seeds can result in different series of random numbers and thereby further enhances the simulated random look. Many different patterns can be produced with each pattern having a different choice of the initial random number seed.

Assume for the moment that the value of the probability density lies between 0 and 1 for each pixel. This process sets the likelihood of an impact for that pixel equal to the probability density. For example, if a pixel has a probability density of 0.6, it has a 60% chance of receiving an impact of the laser beam and a 40% chance of not receiving an impact.

Probability densities greater than one are also contemplated. In general, the integer portion of the probability density for a pixel indicates the minimum value of the impact frequency for that pixel. For example, a probability density of 2.4 for a pixel indicates that the pixel has a 40% chance of receiving three impacts by the laser beam and a 60% chance of receiving two impacts.

According to the invention, the above technique can be extended to permit multiple passes in generating the impact frequency matrix. In this extension, the impact frequency matrix is generated cumulatively by two or more applications of the process described above using the same or different probability density matrices.

One advantage of this process is that it simulates the random nature of the impact of the abrasive particles impinging upon the fabric in a sandblasting process. This at least in part contributes to the much improved look by using the system of the invention over the effects by other laser methods previously disclosed.

Figure 3:
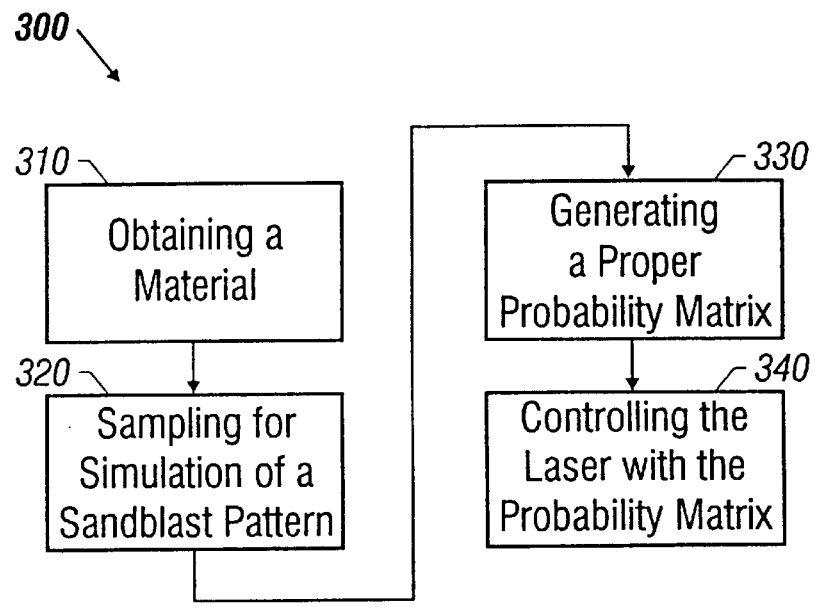
FIG. 3 is a flowchart showing one exemplary method in accordance with the invention.

FIG. 3 is a flowchart which shows a process of producing a desired sandblasted pattern on a fabric. First, at step 310, a sample of an actual sandblasted material is obtained. The surface appearance of the sample pattern is sampled at step 320 so that the exact locations and frequency that the sand particles hit are determined. Next at step 330, a probability density matrix is generated based on the sampling results of step 320 and a random number generation. The probability density matrix and corresponding impact frequency matrix are generated based on pseudo-random numbers. The impact frequency matrix is subsequently used to control the laser beam at step 340 in treating a fabric to simulate the sandblasted appearance.

Figure 4:
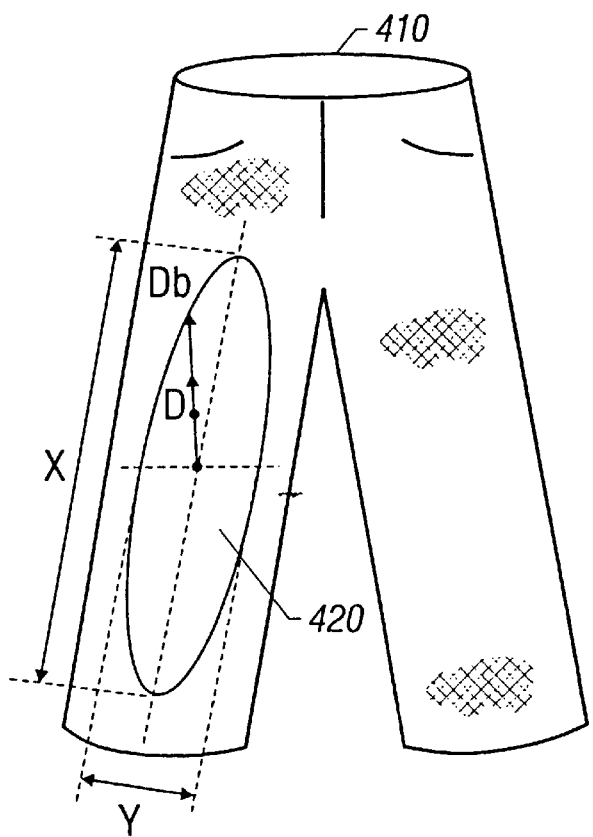
FIG. 4 shows an exemplary elliptical pattern with a worn look on a garment.

The mathematical approach to setting the values of the probability density matrix can be illustrated by an elliptical pattern as shown in FIG. 4. This is an effective way of creating an oval shaped wear pattern around the knee portion of a pair of denim jeans. An elliptical area 420 may be used for simplicity. In general, any geometrical shape may be used. Thus the desired replication of a sandblast pattern is one wherein the frequency of being hit by a laser beam is greatest in the center of the ellipse 320 and diminishes in a continuous but random manner when moving away from the center toward the boundaries. This is produced by a probability density matrix that has the highest probability value in the center of the ellipse and values that decrease continuously in a predetermined manner when moving toward the boundaries.

One method to produce such a probability density matrix begins with the assignment of the X and Y dimensions of the ellipse as indicated in FIG. 4, the probability density at the center O of the ellipse 420 is represented by a and the probability density at the boundary is represented by b which is set to be a constant at any point on the boundary in this example. Then the probability density of a pixel, such as indicated by point D can be determined by the ratio, R, of the distance from the ellipse center O to D to the distance from the center O to a point $D_b$ on the boundary at which the same vector as D intersects with the ellipse 420:

$$R = \frac{OD}{OD_b}$$

The probability density for the point D is then determined as follows:

Probability density=$a+R^p(b-a)$ where the exponent coefficient, p, determines the "roll-off" or the rate of fade in the worn look. For example, for p>1, the roll-off may be considered fast; for p=1, the roll-off is moderate; and for p<1, the roll-off is slow.

Figure 5A:
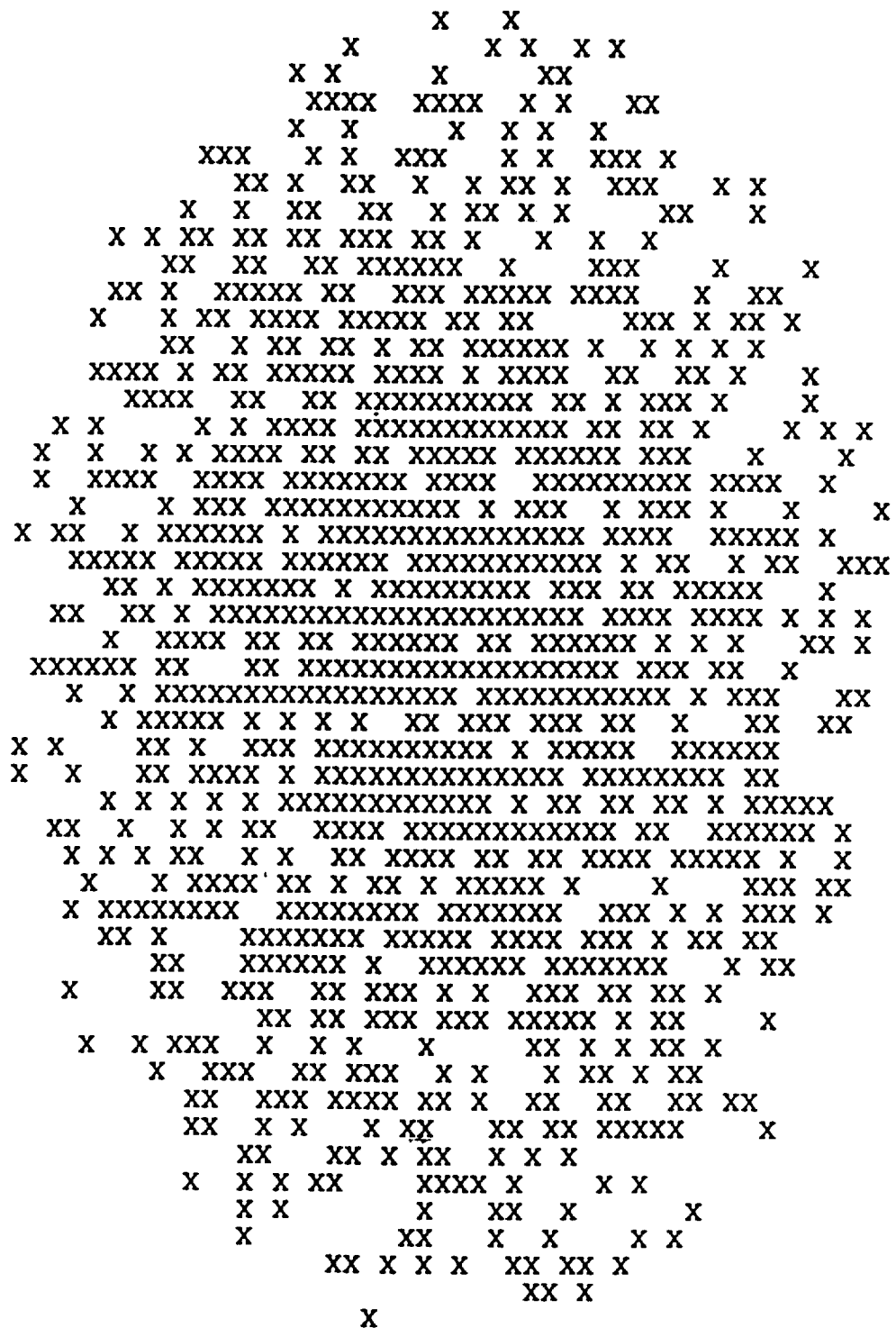
FIG. 5A is a computer generated laser processed elliptical pattern with a single scan according to the invention.
Figure 5B:
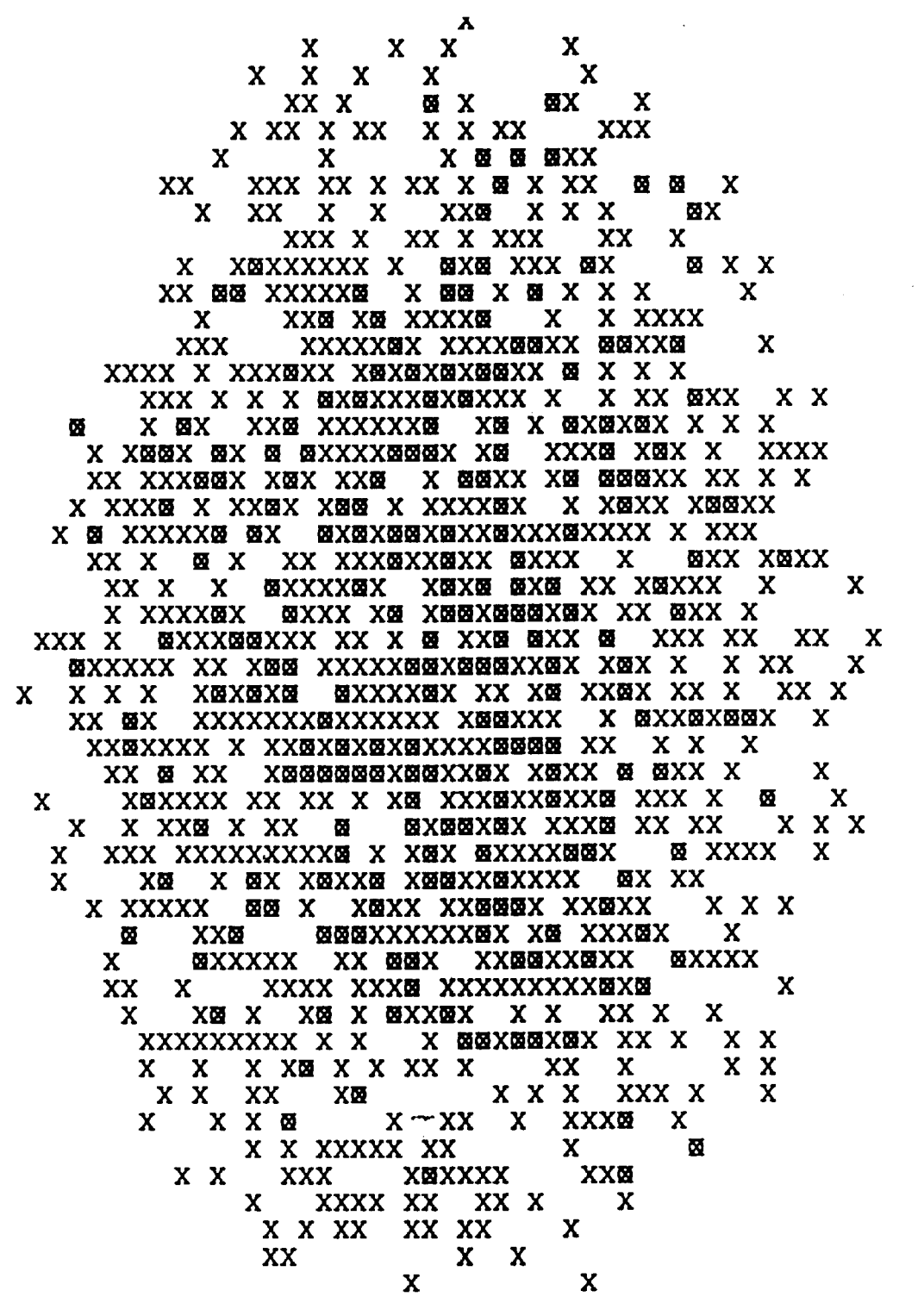

FIG. 5A shows a computer generated laser blast pattern of an ellipse created by setting the center probability density a=0.9, the boundary probability density b=0.1, and the roll-off coefficient p=1, for a single pass process. FIG. 5B shows a pattern with a, b and p set as in FIG. 5A but using a two-pass process.

Figure 6A:
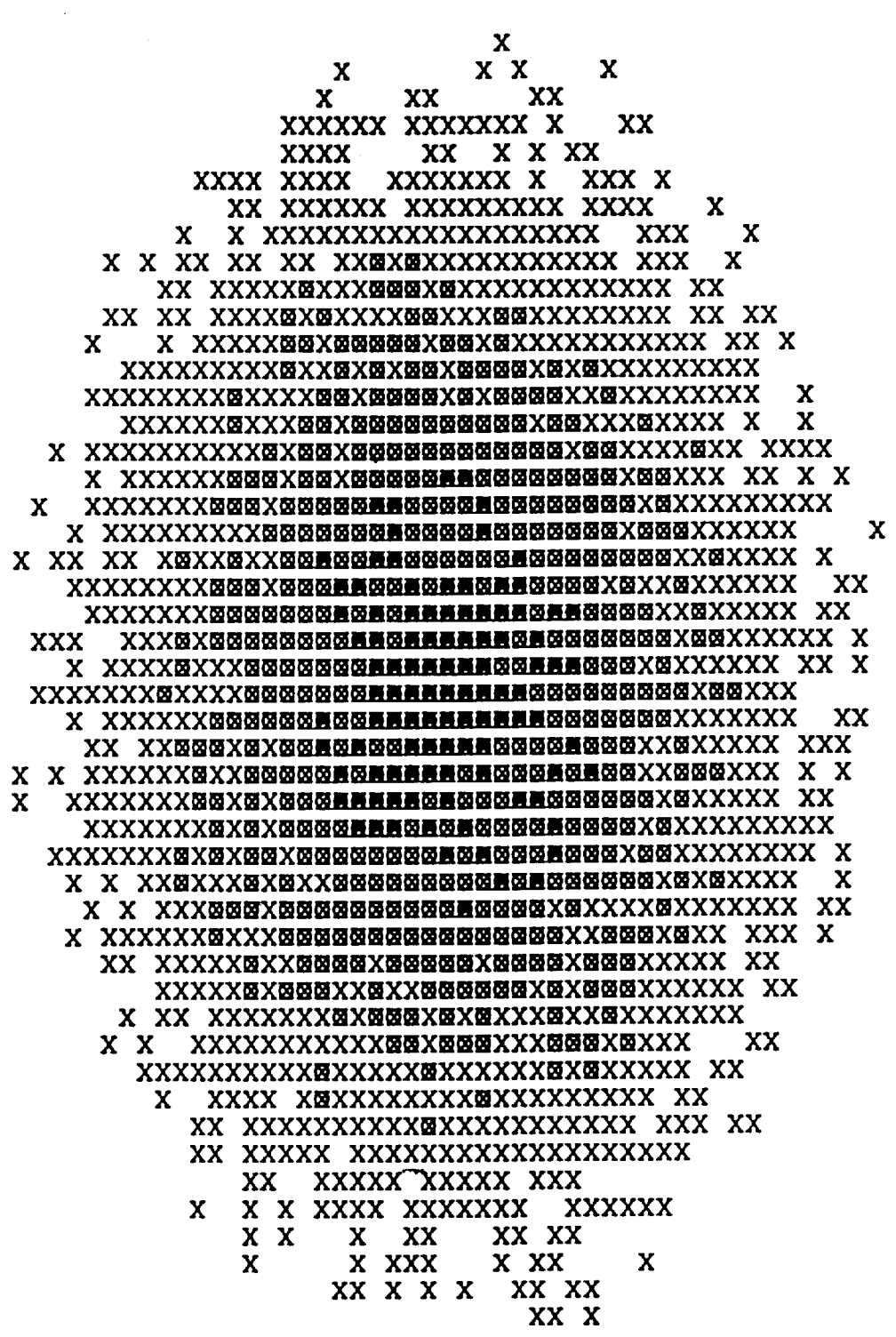
Figure 6B:
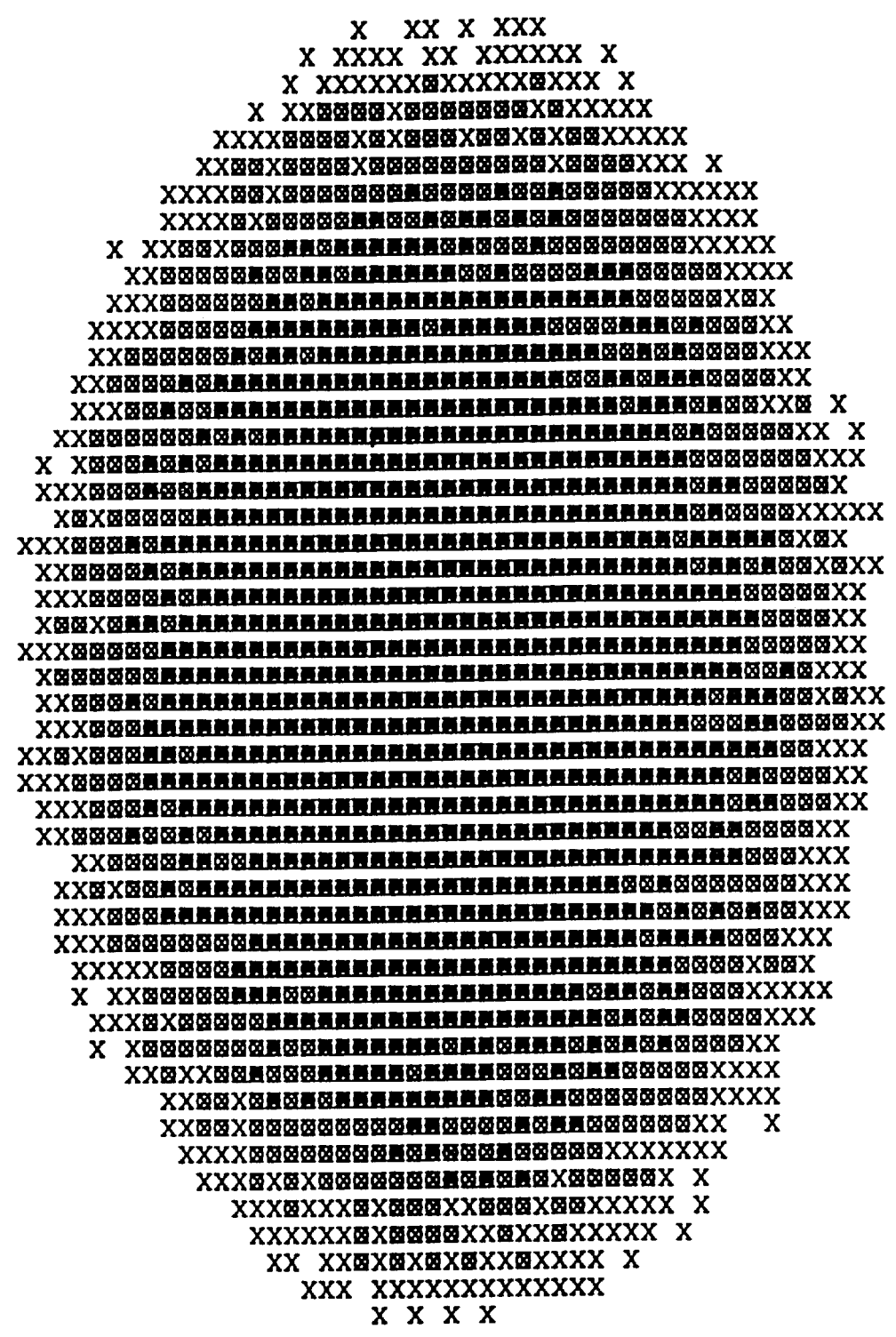

FIGS. 6A and 6B show computer generated laser blasted patterns of an ellipse with a maximum probability density at the center of 3.2 and a probability density of 0 at the boundary. FIG. 6A is generated by a roll-off coefficient p=2 and FIG. 6B is generated by a roll-off coefficient p=0.5. The significance of the roll-off is clearly shown by the difference in outer edge distributions. Thus, the roll-off can be used to precisely control the feathering effect.

Figure 7A:
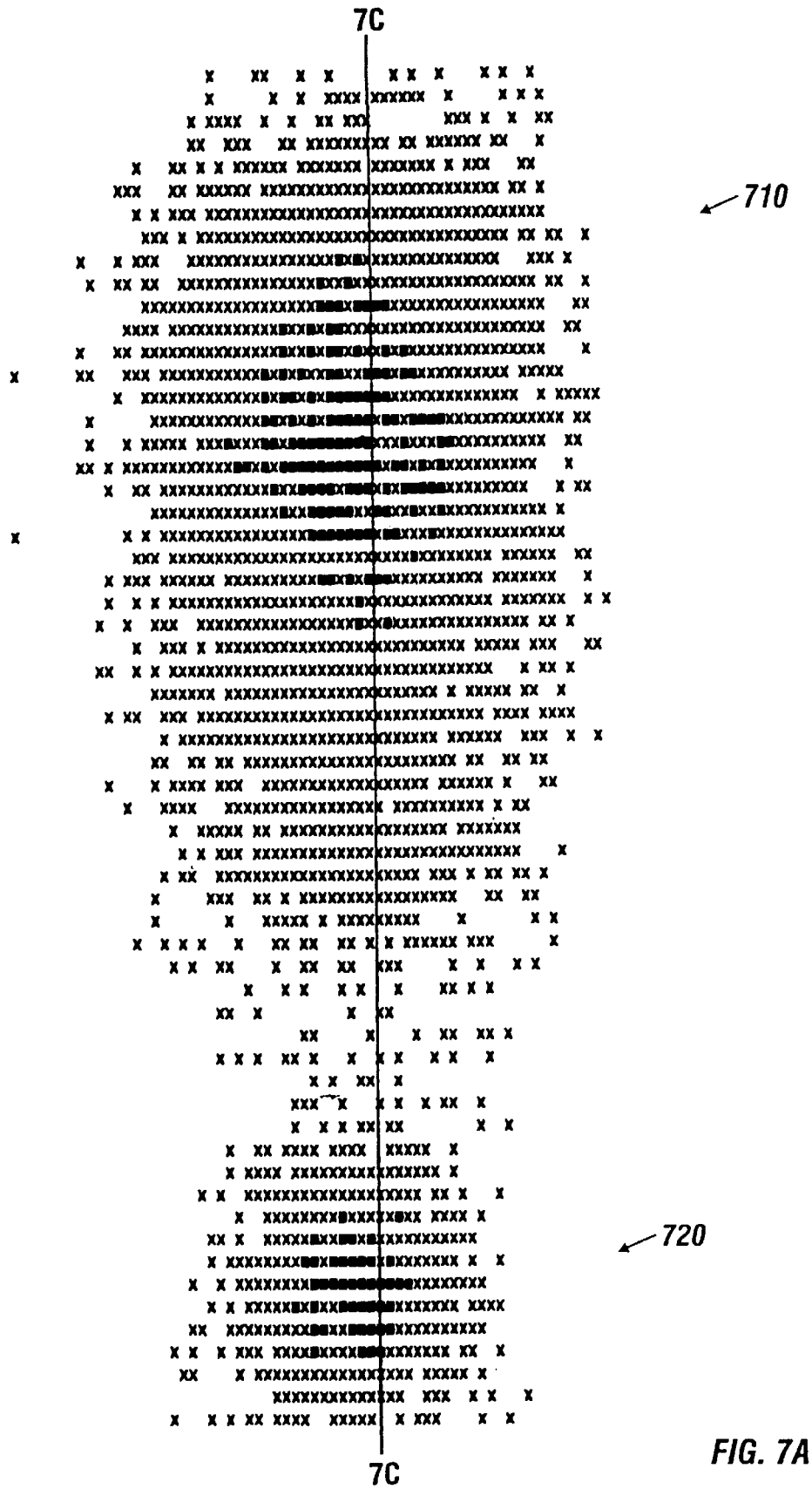
FIG. 7A shows a computer simulated laser processed worn pattern for denim jeans.

According to the invention, more complex patterns may be formed by manually setting the values of the probability density matrix and storing them in a data file. FIG. 7A shows a computer generated pattern having an upper portion 710 and a lower portion 720. The upper portion 710 may be used for the worn look on the lap portion of denim jeans and the lower portion 720 may be used for the worn look in the knee area. This is one of the popular worn looks on many jeans.

FIG. 7B shows the probability density matrix in a tabular form for the laser blasted pattern of FIG. 7A. The highest probability density is 2.0. Notice that FIG. 7B only shows the probability density matrix for the right-hand-side portion of the laser blasted pattern. The laser blasted pattern of FIG. 7A is symmetric about the line 7C—7C.

Figure 8A:
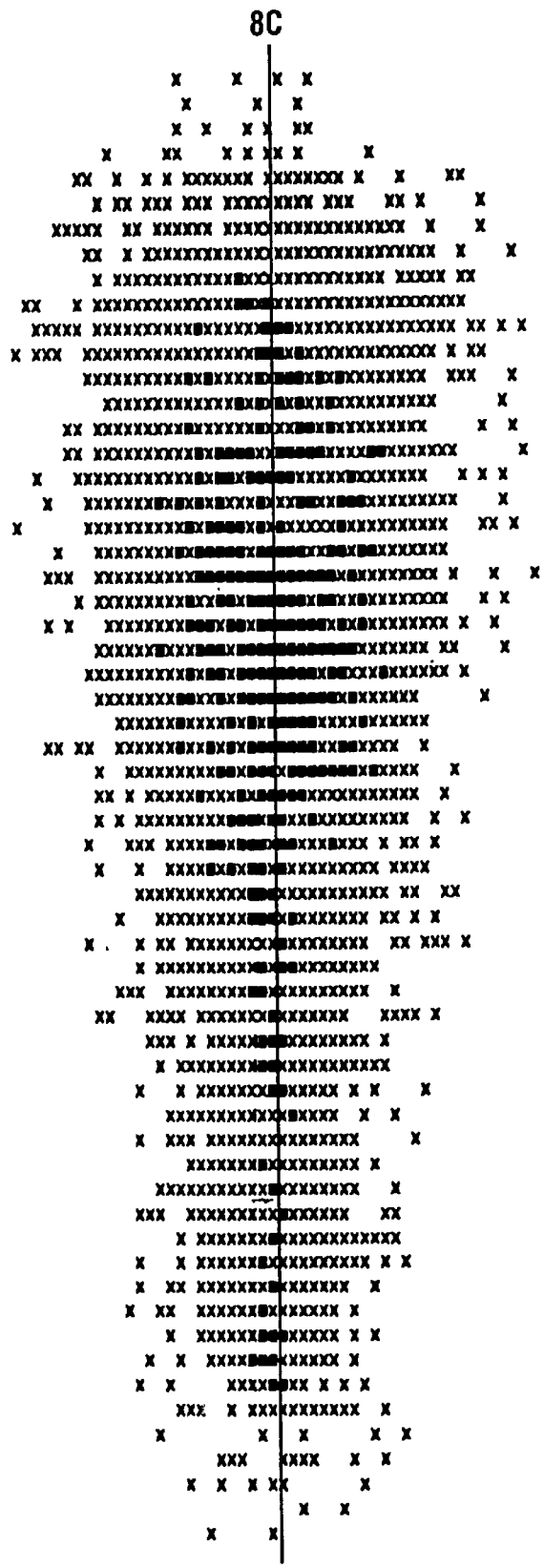
FIG. 8A shows another computer simulated laser processed worn pattern for denim jeans.
Figure 8B:
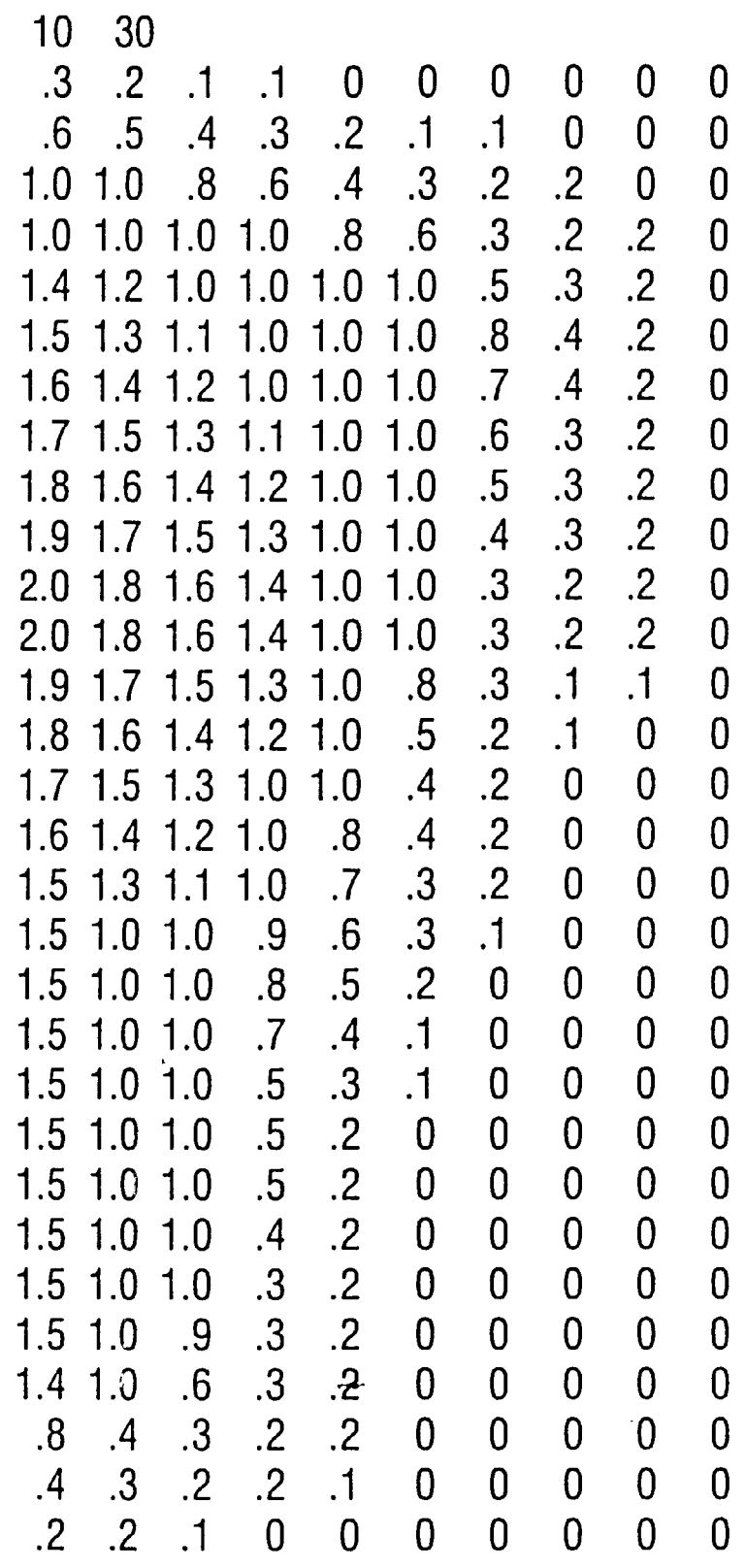

Another laser blasted pattern generated in accordance with the invention is shown in FIG. 8A. The respective probability density matrix for the right-hand-side portion is listed in a tabular form in FIG. 8B.

The spatial orientation of the pattern on the fabric may be adjusted by setting various operating parameters of the laser through either hardware or software implementation. For example, the density of the pixels and the angle of the scan may be set in such a manner.

According to a second embodiment, the impact frequency matrix may be implemented by keeping the laser beam on at the locations that have positive impact frequencies and adjusting operating parameters to increase EDPUT in accordance with the impact frequency, i.e., locations with higher impact frequencies are given higher values of EDPUT. Referring to FIG. 1, EDPUT can be adjusted by changing combinations of the following: the output power level with the power control 112, the scan speed by the beam scanning device 120, the relative distance between the focusing lens 130 and the support stage 140. The EDPUT values used in this embodiment are preferably within a range determined for each material. If the received EDPUT exceeds a maximum limit of the range, the surface may be burned or carbonized. Conversely, the effect of the laser processing may become imperceivable if the received EDPUT is smaller than a minimum limit of the range.

Therefore, one way to change the EDPUT based on the impact frequency matrix is to correlate the EDPUT of the laser system with the impact frequency in a linear or nonlinear relation. The EDPUT value of the laser beam may be set to the maximum value in the allowed EDPUT range for that material for areas assigned with the highest impact frequencies and to the minimum EDPUT value for areas assigned with the lowest impact frequencies. For example, if the center of the ellipse 420 has a probability of 1 assigned by the probability matrix, the corresponding impact frequency matrix can be used to the EDPUT value of the laser beam at the center to the maximum EDPUT in the allowed EDPUT range for that material. At the boundary of the ellipse 420, the probability is 0 and hence the minimum EDPUT value is assigned according to the corresponding impact frequency matrix. Other ways of correlating the impact frequency matrix and the EDPUT values of the laser system may also be used in accordance with the invention.

Test results demonstrated the possibility of nearly exactly simulating the worn look achieved from the sandblast process. The results were particularly encouraging because, to the best knowledge of the inventors, never before has there been a process that can achieve such a look other than the sandblast process.

One aspect of the impact frequency matrix in accordance with the invention is its scalability. An impact frequency matrix of a pattern can be scalable with the dimension of the pattern. This scaling technique may be used to reduce the processing cycle time of a large pattern. For example, the cycle time to process a typical 21-inch oval section from the upper thigh to below the knee on a pair of denim jeans was about at least 6 minutes for a set of operating parameters. The cycle time may be, however, reduced by the following scaling process.

First, an impact frequency matrix is generated for a pattern proportionally smaller than the desired size by a predetermined factor (e.g., a factor of 2). This is configured in a scanning control program in the control computer 150 of the system 100 of FIG. 1. For a given areal density of scanning lines, the processing cycle time of the smaller section is shorter than that of the desired larger section with the same pattern.

Secondly, the scanning control program is set to change a size command to increase the size of the image to the desired size that has been reduced in the first step. This size command may include a height command for changing the height. For example, if the pattern size used in the first step was ½ of the original size, then the height command in the laser file would be set to 2, i.e., twice as large. This effectively scales an impact frequency matrix for the smaller section to process a larger section of the same pattern. The size command is converted as laser control codes which control a processing laser beam to move at a prescribed distance on a workpiece according to positions of matrix elements in the impact frequency matrix.

Next, the EDPUT is adjusted (e.g., increased) so that a high scanning speed setting can be used to further reduce the cycle time for the desired finishing quality.

The effect of the above scaling technique is to make the laser traverse the pattern section at the same number of scanning passes as in the case for a pattern of a smaller (e.g., half) of the size while still keeping the laser scans relatively congruent. An optional step of adjusting the beam spot size may be performed after the resizing step of the scanning control program, in which the spot size of the laser beam 114 is increased to a predetermined diameter by adjusting the relative distance between the focusing optics 130 and the support stage 140. The amount of increase in the beam size usually has a relation with the size reduction factor used in the first step. For denim and some other fabrics, this optional step may not be necessary because of the fabric tolerance of the denim.

A significant reduction in the processing cycle time can be achieved by optimizing the operating parameters, including but not limited to, the scaling factor, the amount of increase in the beam size, the laser scanning speed, and the power of the laser. In processing an 21-inch oval, for example, the processing cycle time can be reduced by six folds from about 6 minutes to about 1 minute with a scaling factor of 2.

Another aspect of the impact frequency matrix technique is that the impact frequency matrix can be easily configured to generate a variety of different surface looks including different degrees of wearing in the sandblasted worn look. For example, an impact frequency matrix can be generated to produce a variety of pixelated looks and looks as if a shotgun pellets or other media were blasted onto the fabric. This can be accomplished by merely changing the probability densities within a boundary of a desired pattern. For example, probability densities at the center and boundary of the previously-described elliptical pattern in FIG. 4 can be changed for different looks. In addition, various graphics can be superimposed in a laser blasted section using the same laser system. A graphic may be scribed onto a selected area of a fabric first and then the laser blasted process is performed to achieve a desired worn effect on the scribed graphic.

Few surface processing techniques, including the sandblasting process and the previously disclosed laser techniques, are capable of providing the flexibility, diversity, and the precise control of the preferred matrix technique of the present invention.

Figure 9A:
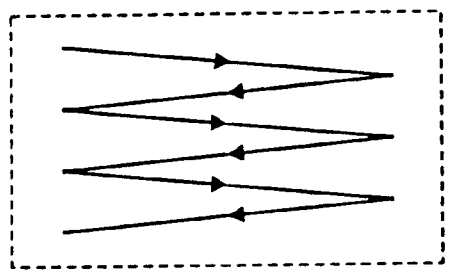
FIGS. 9A–9D are schematics showing different exemplary laser scanning traces in accordance with the invention.
Figure 9B:
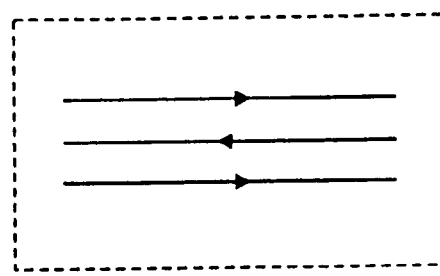
Figure 9C:
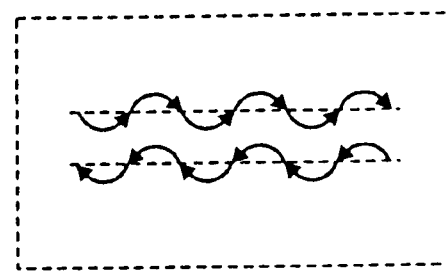
Figure 9D:
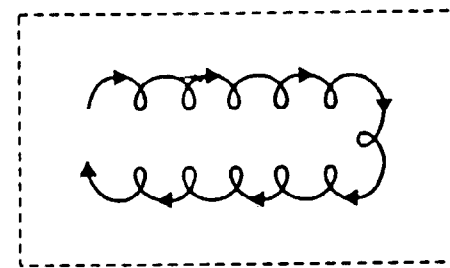

According to the invention, multiple laser scanning passes are performed in treating a selected section of a surface. In general, any beam scanning scheme may be used in accordance with the invention. For example, a commonly used line scanning scheme may be used to scan a surface in a line-by-line manner with each scanning line being a substantially straight line. FIGS. 9A and 9B show two examples of scanning in straight lines. The inventors discovered that non-straight scanning lines may also be used to achieve certain surface appearance that may not be possible with straight scanning lines. In particular, scanning in non-straight lines may be used to enhance the feathering effect on a fabric. Referring to FIG. 1, the beam steering and scanning device 120 and/or the focusing optics 130 may be controlled with the control computer 150 so that the trace of the scanning beam on a surface forms a certain waveform pattern. FIG. 9C shows a sine or cosine type scanning line. FIG. 9D shows "wobbling" scanning lines. Two adjacent wobbling lines may or may not overlap with each other. The wobbling scanning lines can be used in the scaling technique to compensate for the increased scanning spacing due to the increase in the size of an area to be processed.

Figure 10A:
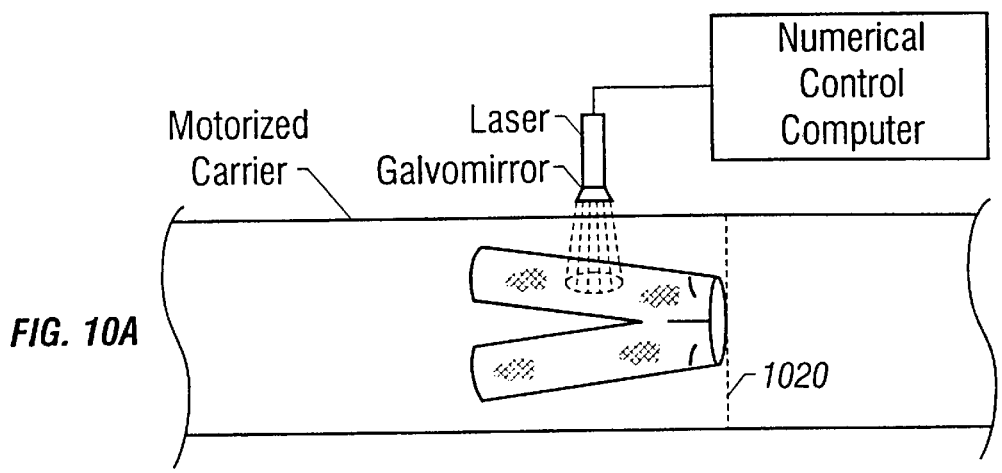
FIGS. 10A–10C are schematics illustrating three examples of laser precessing system for a garment production line.
Figure 10B:
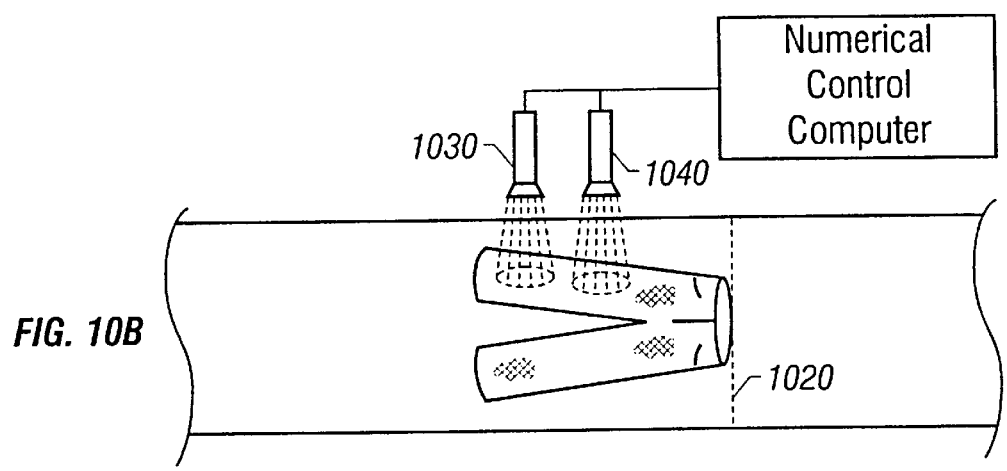
Figure 10C:
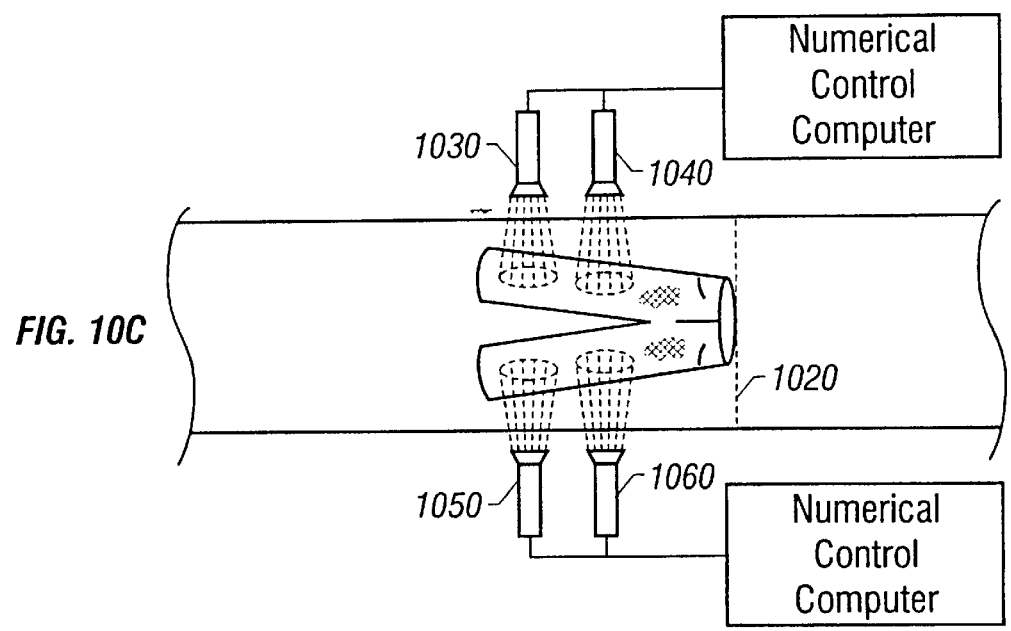

FIGS. 1 and 2 generally show laser processing systems for scribing graphics and treating surface on a workpiece. These systems can be used for processing denim jeans or other garments. FIGS. 10A–10C illustrate three examples of a laser processing system for denim jeans. A motorized carrier 1010 (e.g., an assembly line) provides an automated way for feeding denim jeans one by one to a processing location wherein the laser system is located. An autosizer 1020 having automatic sizing sensors to detect the actual size of the garment so that a proper location can be determined to impart either a graphic or a worn look. In FIG. 10A, a single laser beam produced by a laser 1030 is used to process one section at a time. Multiple laser beams can be used to simultaneously processing multiple sections on a pair of denim jeans to increase the processing speed of the system. For example, FIGS. 10B and 10C show that two lasers 1030 and 1040 are used produce two beams for simultaneously processing two different sections on pair of jeans. The lasers can be positioned on top of a table with a laser beam impinging upon the fabric approximately in a vertical direction or the lasers can be positioned so that a laser beam impinges upon the fabric approximately in a horizontal direction.

Figure 11:
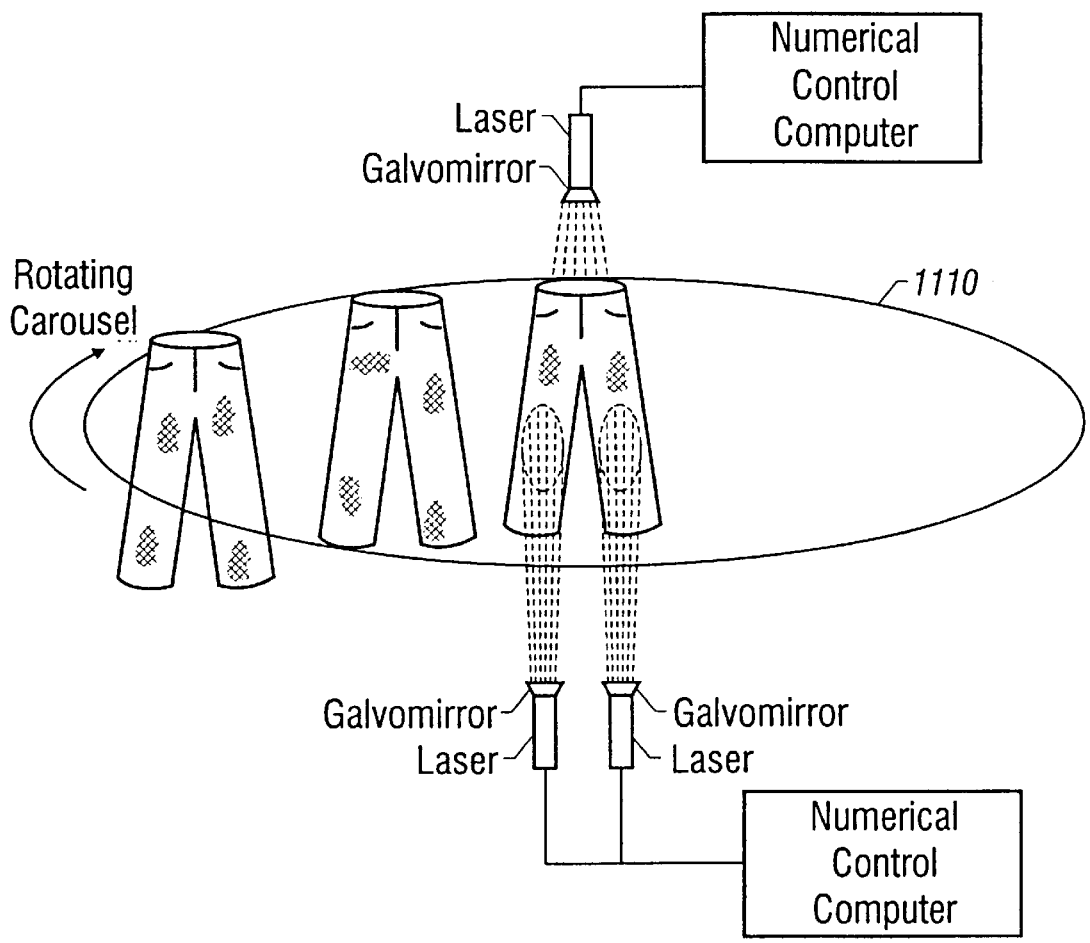
FIG. 11 shows a laser processing system with a rotating garment carousel and multiple lasers.

FIG. 11 shows another laser processing system in accordance with the invention. A motorized rotating carousel 1110 is used so that the jeans draped over a form can be automatically fed to a processing location. One or more laser beams can be used to simultaneously process one or more sections on a pair of jeans. The example of FIG. 11 shows that the front legs and back panels are being processed as the rotating carousel 1110 indexes the garment for subsequent processing.

Another aspect of the invention is that the laser processing process may be used either after the garments are sewn and washed, or before they are sewn and washed.

Figure 12:
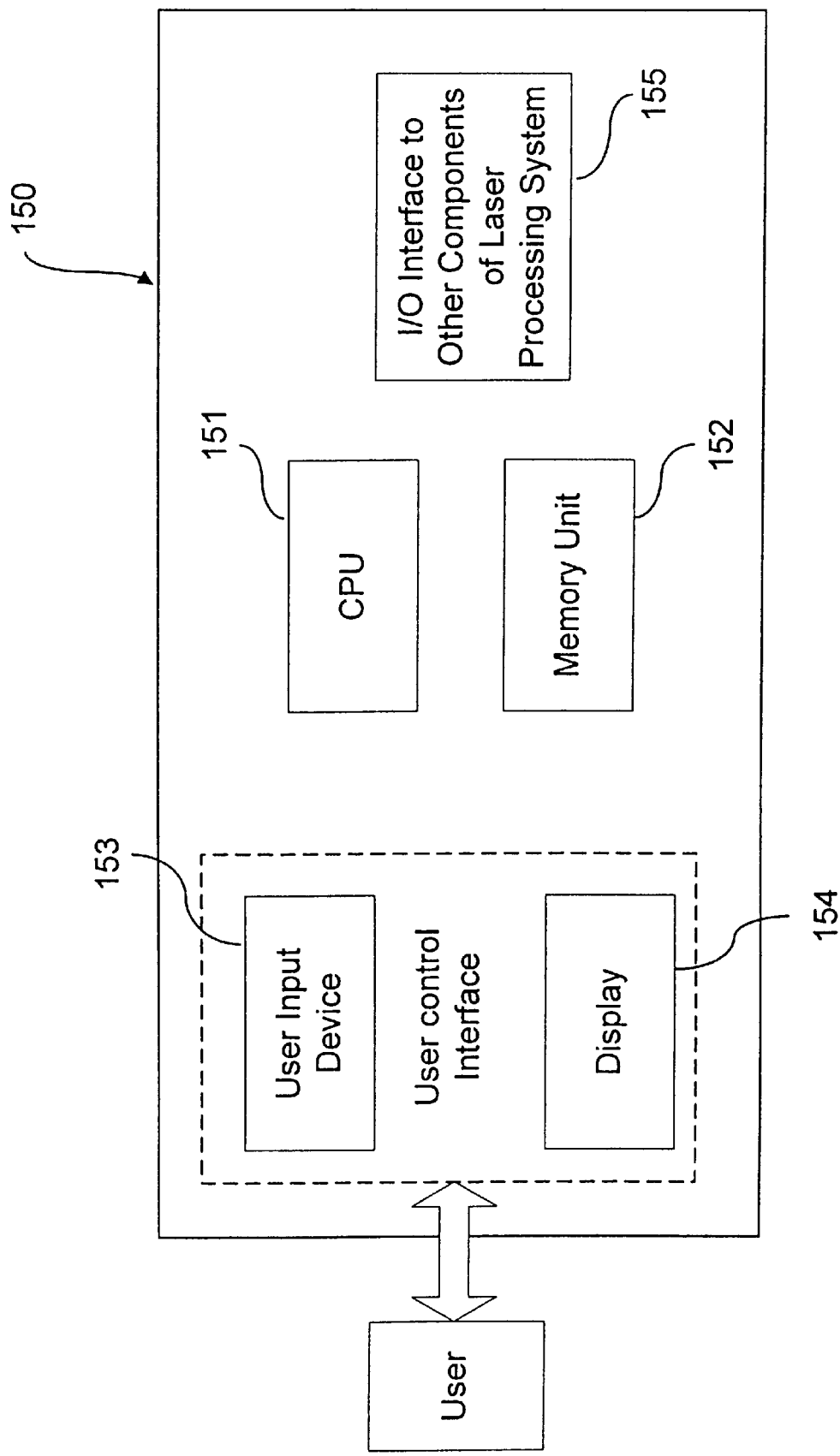
FIG. 12 is a block diagram further showing components of the control computer.

FIG. 12 further shows some components that can be included in the control computer 150 of FIG. 1. A central processing unit ("CPU") 151 is the engine of the computer 150 which includes a microprocessor. A memory unit 152 is used to store data and instructions. For example, the data may include the geometrical shape of a pattern, a pattern density matrix, the probability density matrix, the impact frequency matrix, and laser control codes. The instructions may include software packages for, e.g., generating the pseudo-random numbers, producing probability density and impact frequency matrices, controlling display contents, managing data, and controlling various components in the laser processing system.

A user input device 153 receives and transmits a user's instructions or entered data to the CPU 151. A cursor-pointing device (e.g., a mouse), a computer keyboard, or a touch-screen input device may be used alone or in a combination to serve as the user input device 153.

A display 154 may be any device capable of displaying text and graphics, such as a CRT monitor, a LCD display, or a video projection device.

An input/output interface 155 indicates either a stand-alone interface or a portion of an integrated interface that connects to other components of the laser processing system. For example, FIG. 1 shows that the laser power control 112, the beam steering and scanning device 120, and focusing optics 130 may be connected to and communicated with the CPU 151 through the interface 155.

A user control interface is implemented in the system. The interface includes the user input device 153 and the display 154 which are supported by the CPU 151, the memory unit 152 and other components of the control computer 150. This feature allows a user to simulate a sandblast pattern produced with an impact frequency matrix by a graphic representation of the pattern on the display 154. Such a visual representation of the pattern may be used to determine the appearance of a pattern or to compare the effects of different impact frequency matrices for the same geometrical pattern, prior to actually marking the pattern onto a surface by the laser.

For example, the geometry of a pattern can be any shape and can be conveniently and quickly generated by a software at any time according to a user's desire. The characteristics of the probability density matrix, such as roll-off coefficient for feathering effects and the maximum/minimum probability densities, may be changed during the simulation stage until a desired result is achieved. The initial random number seed may also be altered to obtain different random numbers in forming the impact frequency matrix.

All these and other pattern manipulations can be done through the user control interface of the control computer. Advantages of this aspect of the invention include flexibility, reduced cost and time of design.

Figure 13A:
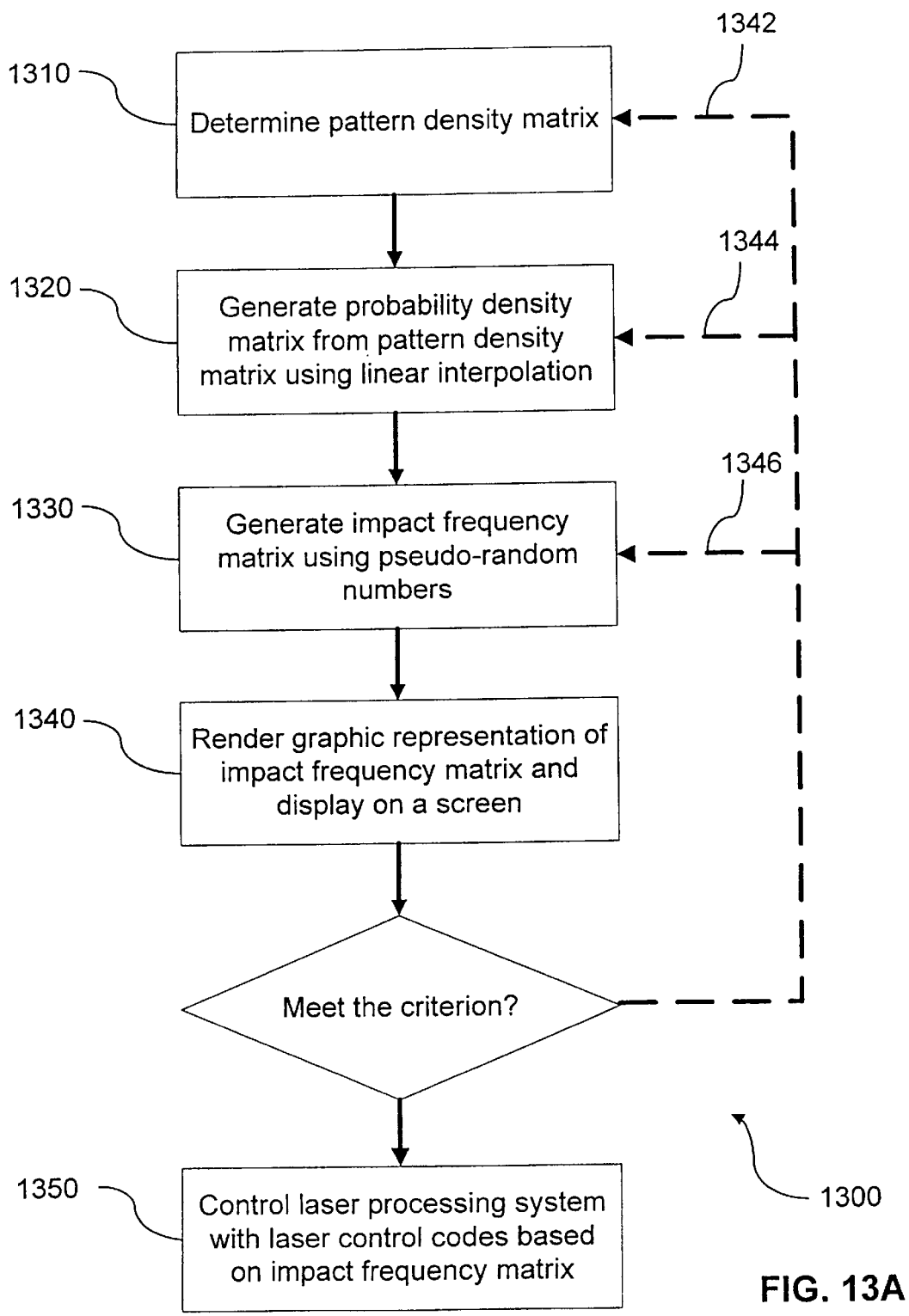
FIG. 13A is a flowchart for one exemplary mode operation using an initial patten density matrix.

A processing process different to the process shown by the flowchart 300 may be implemented by using the user control interface. One embodiment is shown in FIG. 13A.

Initial geometry (e.g., shape and dimension) and the "blasting" density distribution are selected to form a pattern density matrix. Similar to the probability density matrix, each element in the pattern density matrix includes information of both the geometrical shape and the density. Preferably, the pattern density matrix is small, for example, limited up to about a few hundred elements in each dimension. The shape may be any shape selected by the user or to meet a need in a specific application. In particular, any irregular pattern may be implemented in a pattern density matrix.

The geometrical features of a pattern represented by a pattern density matrix may be created in a systematic manner using mathematical formulas or equations. This systematic approach may be advantageous in certain shapes and can substantially eliminate the size limitation of a pattern density matrix since the pattern matrix may be generated by using a computer. However, for certain irregular patterns and particularly some unusual artistic geometric patterns, implementation of the above systematic method may be time consuming since complex mathematical derivation or calculations may be necessary to derive one or more formulas and equations to represent the irregularities of the shape. Hence, a small size pattern density matrix may be created manually by typing in the desired matrix elements through, for example, the computer keyboard, or by converting a graphic pattern in digital form into desired matrix elements.

The pattern density matrix may be edited at any time by the user. In addition, the pattern density matrix may be in numerical tabular form as a conventional matrix or in a graphical form. The pattern density matrix can be saved in the memory unit 152 for further processing. This completes the step 1310.

In step 1320, scale factors are first determined for expanding the pattern density matrix into a probability density matrix at a desired size. One scale factor is sufficient if the scaling is only performed in one direction. Two more scaling factors may be needed for more complex scaling operations in multiple directions. A linear interpolation may be implemented in forming a probability density matrix from a pattern density matrix in order to preserve the relative density distribution of the original pattern density matrix. This linear interpolation is two dimensional since it is performed in the same plane. In many practical cases, a linear interpolation in each of two orthogonal directions may be desirable.

Next in step 1330, an initial random number seed is selected and the impact frequency matrix is formed by correlating the probability density matrix with the random numbers produced by a pseudo-random number generation based on the seed.

In step 1340, a graphic representation of the impact frequency matrix is generated. This may be done by using a graphic program. The graphic is displaced on the display 154 to show the user what would be the appearance of a treated surface if the impact frequency matrix is actually used to process a surface with the laser processing system.

If the user decides the appearance is satisfactory, the impact matrix is then used to generate laser control codes for a subsequent surface treatment.

If, however, the user decides the surface appearance is not satisfactory, the impact frequency matrix may be changed by adjusting at least one of the following: the pattern density matrix by following the loop 1342, the probability density matrix by following the loop 1344, or the initial random number seed by following the loop 1346. The above process may be iterated multiple times until a desired graphic representation is achieved with the impact frequency matrix.

Table 1 shows an example of a 5×5 pattern density matrix. The values of the matrix elements dictate both the density distribution and the geometrical shape. In this example, the pattern density matrix of Table 1 shows a diamond-like shape and a maximum density value at the center and a density distribution that decreases from the center to the peripheral.

TABLE 1

| Pattern Density Matrix | | | | |
|---|---|---|---|---|
| 0 | 0 | 0.4 | 0 | 0 |
| 0 | 0.4 | 0.8 | 0.4 | 0 |
| 0.2 | 0.6 | 1.0 | 0.6 | 0.2 |
| 0 | 0.4 | 0.4 | 0.4 | 0 |
| 0 | 0 | 0.4 | 0 | 0 |

A 2D linear interpolation can be performed on the pattern density matrix shown in Table 1 to produce a respective probability density matrix. For example, two scaling factors, 2 and 3, can be selected for x and y directions, respectively. Thus, the probability density matrix has 10 columns and 15 rows (i.e., a 15×10 matrix). FIG. 13B shows the probability density matrix.

Next, a 15×10 array of pseudo-random numbers produced from a selected seed is used to correlate with the probability density matrix. This generates a impact frequency matrix as shown by FIG. 13C for a single pass process. For a two-pass process (i.e., corresponding to a maximum density value of 2), the impact frequency matrix is shown in FIG. 13D.

Figure 14:
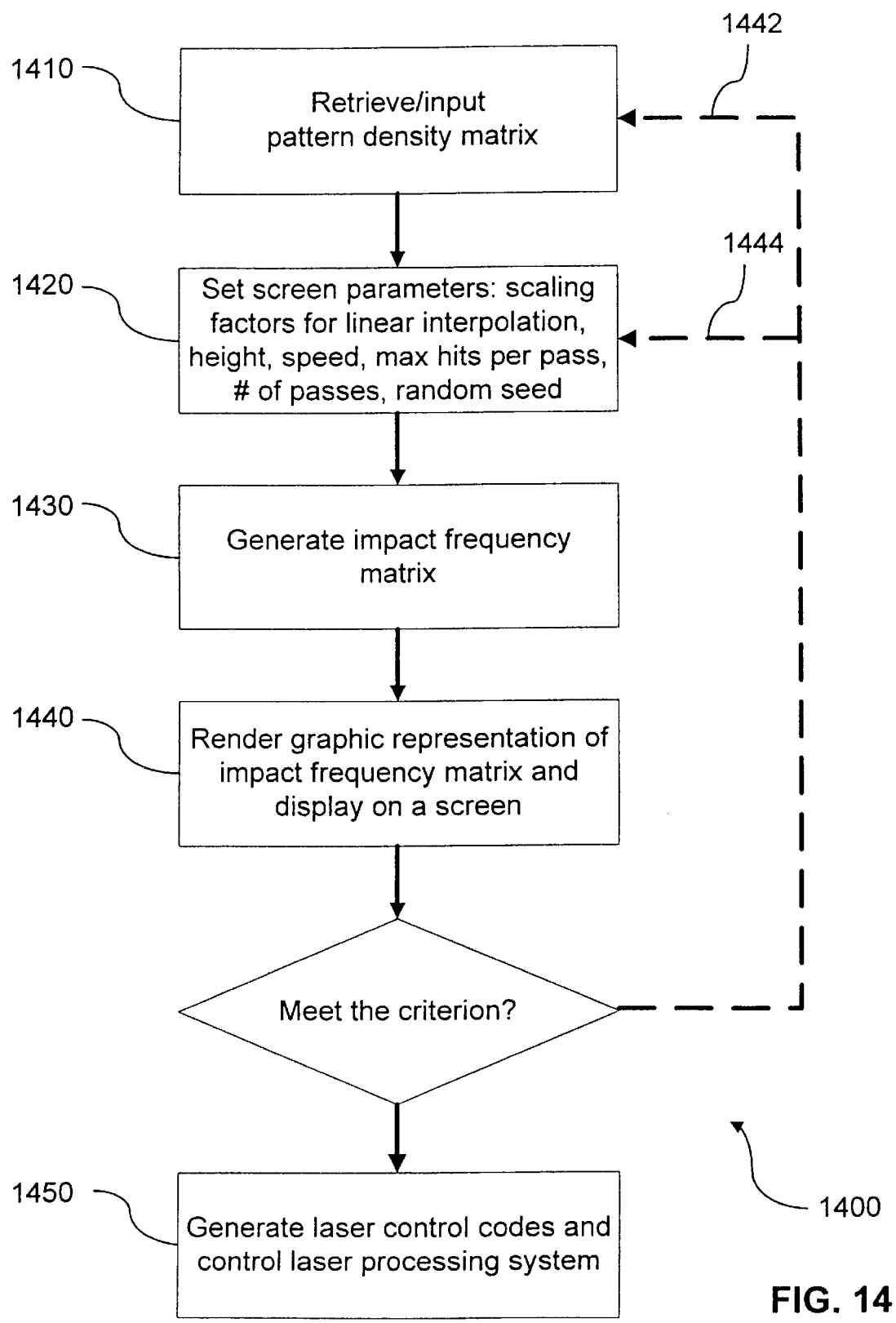
FIG. 14 is a flowchart showing a user interface process based on FIG. 13A.

The flowchart 1300 reflects the execution steps of a software that controls the user control interface. This process may take a different form to the user at the user control interface in order to be user friendly and convenient. For example, the steps 1320 and 1330 and the associated with the feedback loops 1344 and 1346 may appear as a single-step process of producing the impact frequency matrix to the user. Therefore, one embodiment of the user interface flow can look like FIG. 14.

Initially, a user is given the option to either retrieve a pre-stored pattern density matrix in the memory or input a new one (step 1410). An option may be implemented to allow the user to view the density matrix in either tabular mode or graphical mode. At step 1420, a user enters all parameters for the probability density matrix and impact frequency matrix. The user then proceeds to generate the impact frequency matrix at step 1430. Subsequently, the graphic rendition of the impact matrix is displayed on the screen. At this point, the user may choose one of the three choices: go ahead to generate the laser codes (step 1450), reset the screen parameters to generate a new impact frequency matrix (loop 1444), or use another pattern density matrix to restart the process. Notice that the underlying execution of step 1320 (generating probability density matrix) in the actual software process is invisible to the user in the user interface.

Figure 15:
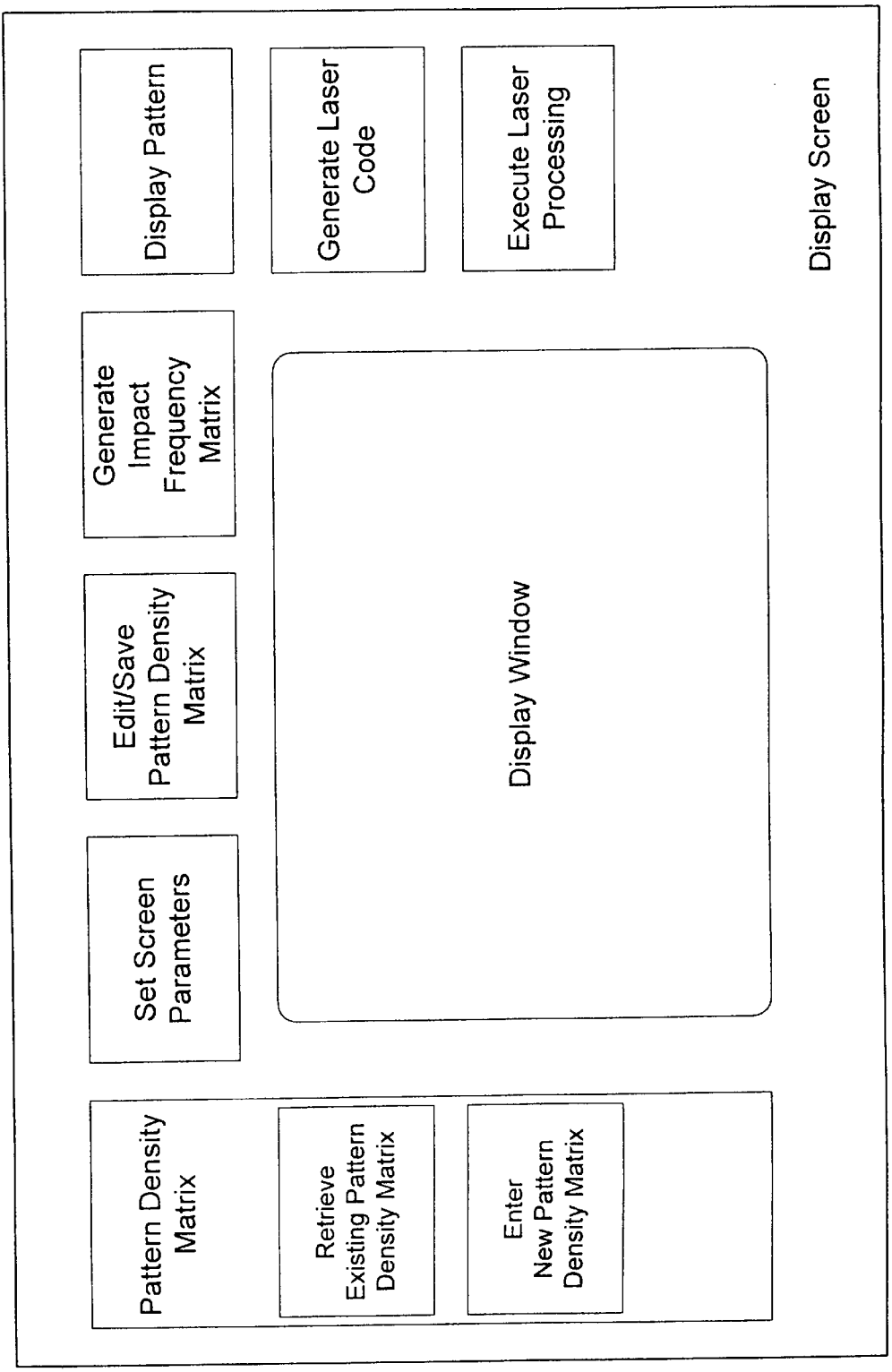
FIG. 15 is a block diagram showing a graphic user interface based on FIG. 13A.

An on-screen graphic user interface (GUI) may be implemented based on the flowchart 1400. An example is shown in FIG. 15.

Figure 16:
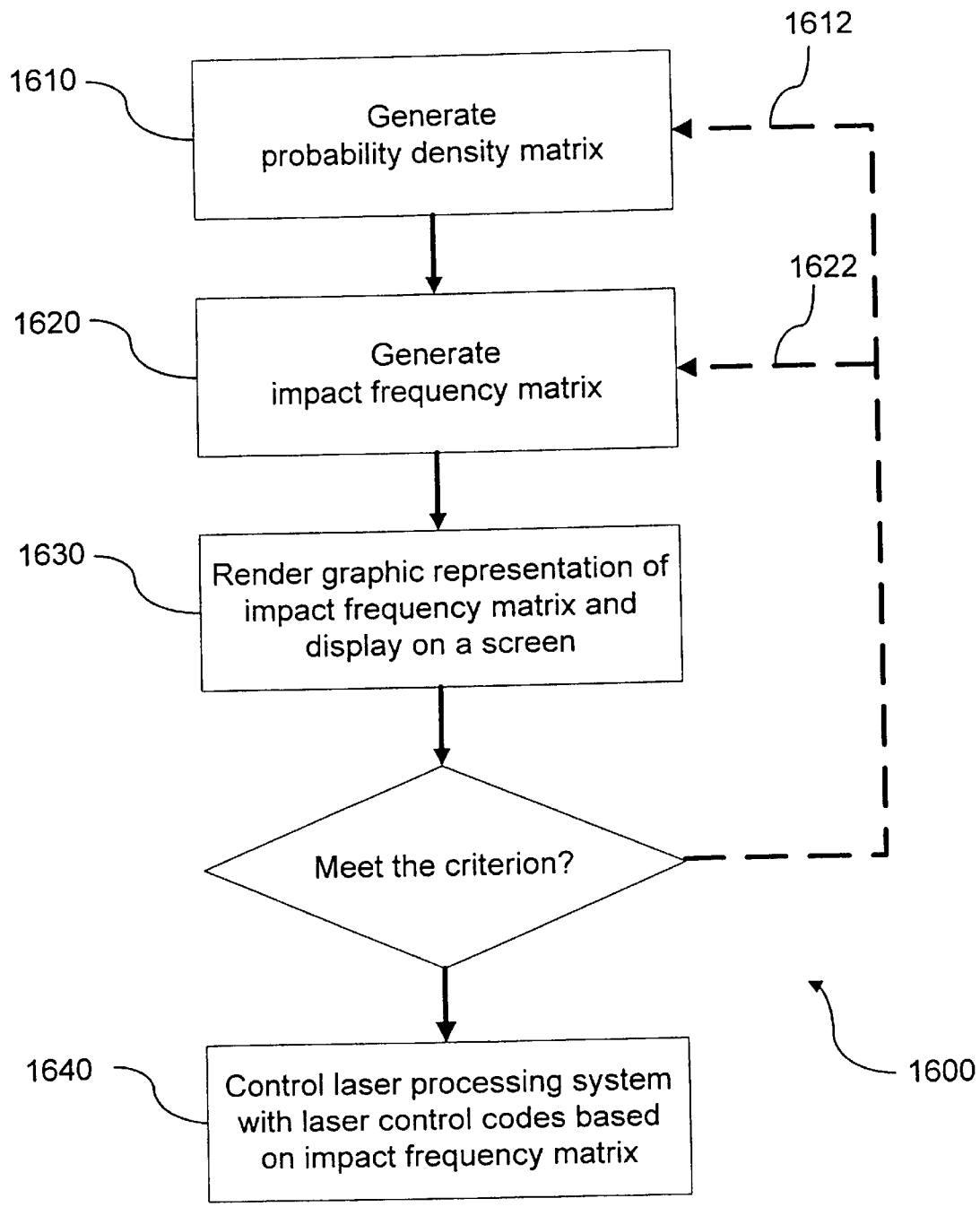
FIG. 16 is a flowchart for one exemplary mode operation using an initial probability density matrix.
Figure 17:
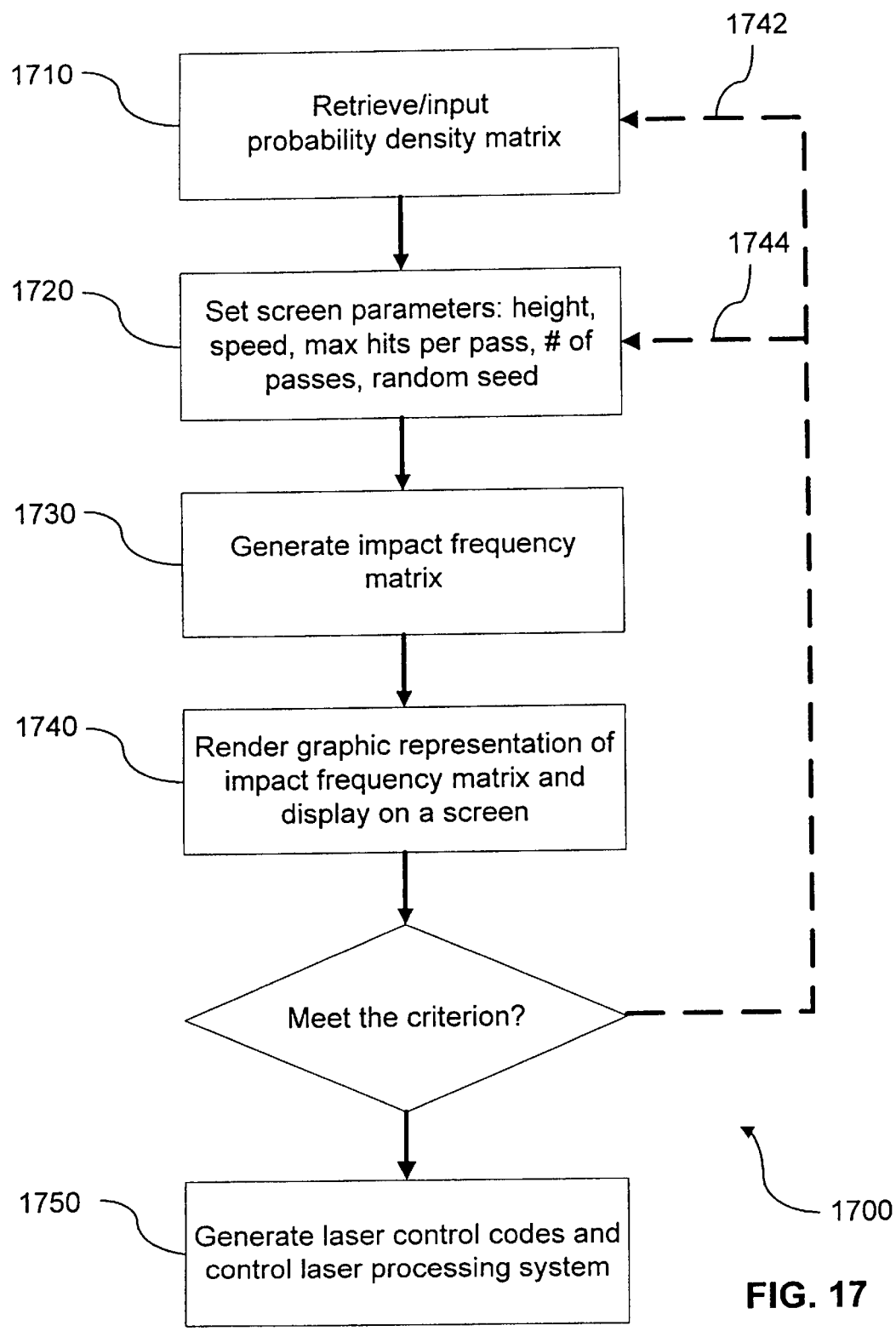
FIG. 17 is a flowchart showing a user interface process based on FIG. 16.
Figure 18:
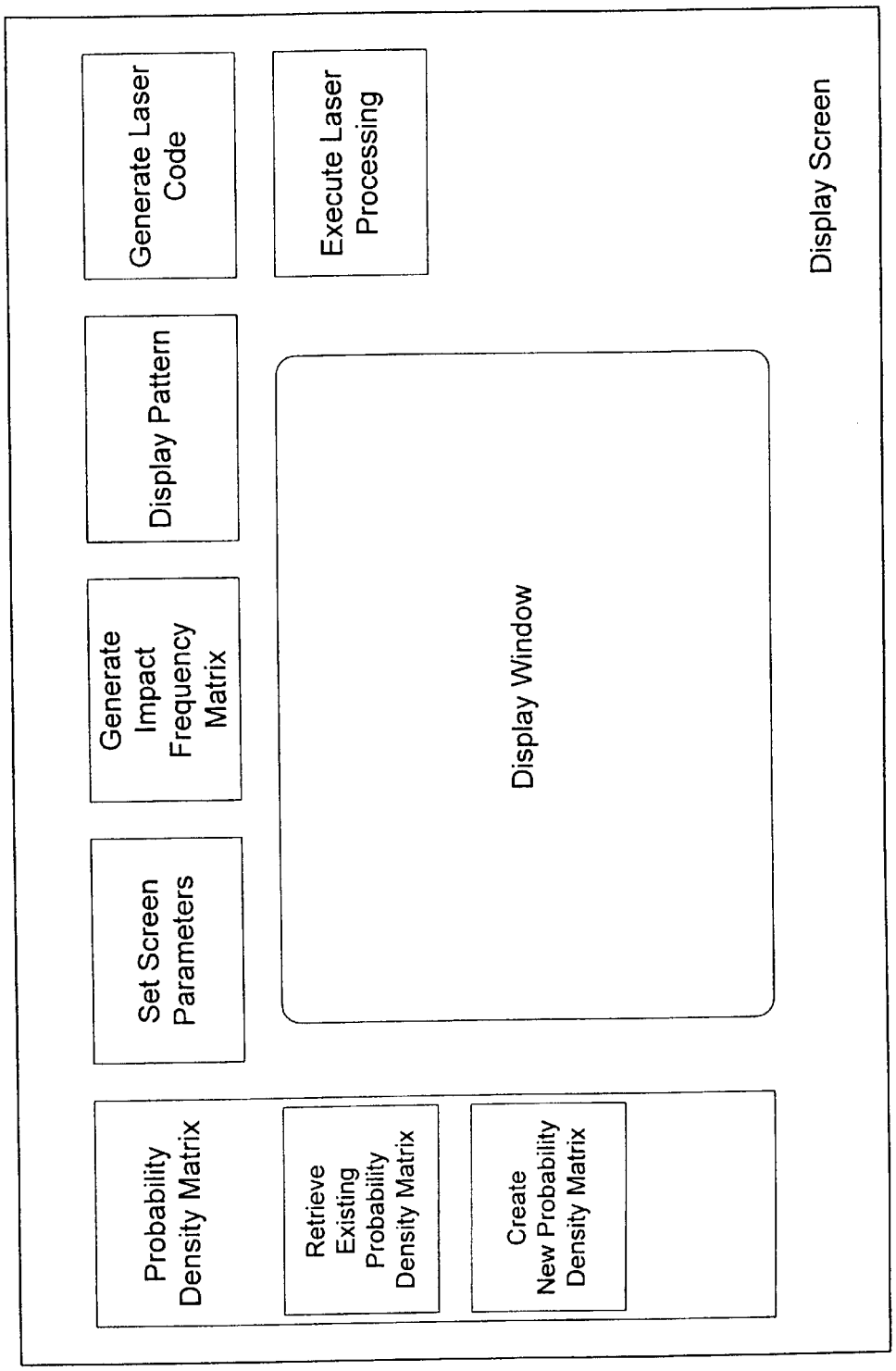
FIG. 18 is a block diagram showing a graphic user interface based on FIG. 16.

For applications with geometrical shapes that may be generated with mathematical formulas or equations, the steps related to a pattern density matrix can be eliminated since a probability density matrix can be easily created by the control computer. Elliptical shape patterns marked on jeans are examples of this type of applications. FIG. 16 shows an embodiment of the control software for the user control interface. FIG. 17 shows an embodiment of the user interface flowchart. FIG. 18 shows an example of the GUI based on the flowchart of FIG. 17.

The above-described user control interface may also be used in scribing patterns on a surface. Thus, a pattern may be displayed for inspection or design purpose prior to actual processing.

Although the present invention has been described in detail with reference to the preferred embodiment, one ordinarily skilled in the art to which this invention pertains will appreciate that various modifications and enhancements may be predictable. For example, the support stage 140 in the system 100 of FIG. 1 can be movable by a motor controlled by the control computer 150 so that a fixed laser beam can be used for scribing graphics or creating a worn look since a fabric can be moved relative to the laser instead.

For another example, the single output beam 114 from the laser 110 may be divided into multiple beams and each of the multiple beams can be independently controlled with a set of beam steering and focusing devices. Therefore, the multiple beams from the single laser may be used to simultaneously process different sections of a garment.

Furthermore, two independently-controlled scanning laser beams may be used simultaneously to process a same section of a garment with one scribing a graphic and another one producing a desired worn look. This may also increase the throughput of the system.

Yet another variation of the preferred embodiment is implementation of multi-pattern processing with a single execution of the control processes illustrated in FIGS. 3, 13, 14, 16 and 17. Two or more processing laser beams are controlled by the same impact frequency matrix to process two or more different areas on one or more workpieces. For example, the same pattern would be created on both sides of a garment by using position offsets and angular realignments in controlling one or two laser beams. If a single laser is used, the beam position and direction are changed from processing one area to processing another area with the same impact frequency matrix. Thus, two areas are sequentially processed. If two lasers are used, the position offsets and angular realignments are used to control the lasers to aim at different areas with possibly different directions. In this case, the two areas are processed simultaneously according to the same impact frequency matrix.

These modifications and others are intended to be encompassed by the following claims.

What is claimed is:

1. A sandblasting simulating apparatus, comprising:
    a laser system, producing a laser beam which moves relative to a surface of a material to mark a pattern on said material according to an applied command;
    a controller connected to said laser system and configured to communicate with said laser system to generate said applied command according to information indicative of said pattern, said information including a pseudo-random characteristic which simulates a sandblasted effect; and
    a user control interface which includes a user input device and a display, said user control interface connected to said controller and configured to produce a graphic representation of said pattern based on said information on said display prior to actually processing said material with said laser system and to allow for modification of said laser impact frequency information.

2. An apparatus as in claim 1, wherein said information is in the form of a laser impact frequency matrix in which values and positions of matrix elements indicate geometry and appearance of said pattern and said impact frequency matrix is generated by a correlation of pseudo-random numbers with a probability density matrix indicative of processing density of laser marking within said geometry of said pattern.

3. An apparatus as in claim 2, wherein said modification of said laser impact frequency information is performed by changing said probability density matrix.

4. An apparatus as in claim 2, wherein said modification of said laser impact frequency information is performed by changing said pseudo-random numbers.

5. An apparatus as in claim 2, wherein said user control interface is configured to effect a user graphic interface displayed on said display, said user graphic interface including a display window for displaying graphics and texts and a command window having a plurality of user control buttons.

6. An apparatus as in claim 5, wherein said user control buttons include a first control button for receiving or creating said probability density matrix, a second control button for setting screen parameters for editing said probability density matrix and impact frequency matrix, a third control button for executing a display of a simulated pattern, a fourth control button for generating laser control codes, and a fifth control button for sending said laser control codes to said laser system.

7. An apparatus as in claim 3, wherein said probability density matrix is generated by a pattern density matrix by performing a linear interpolation using user-selected scaling parameters.

8. An apparatus as in claim 7, wherein said controller comprises:
    means for determining said pattern density matrix indicative of said pattern;
    means for generating said probability density matrix in response to user's parameters based on said pattern density matrix;
    means for generating said impact frequency matrix based on a user-selected random seed number for generating said pseudo-random numbers;
    means for producing a graphic representation of said pattern according to said impact frequency in response to a user command; and
    means for generating said laser control codes using said impact frequency matrix.

9. An apparatus as in claim 2, wherein said controller includes:

means for generating said probability density matrix in response to user's parameters based on said initial pattern density matrix;

means for generating said impact frequency matrix based on a user-selected random seed number for generating said pseudo-random numbers;

means for producing a graphic representation of said user-defined pattern according to said impact frequency in response to a user command; and means for generating laser control codes using said impact frequency matrix.

10. A method of simulating a sandblasting pattern using laser processing, comprising:

forming a probability density matrix indicative of geometry and appearance of the sandblasting pattern;

correlating a set of pseudo-random numbers with said probability density matrix to generate an impact frequency matrix; and generating laser control codes based on said impact frequency matrix.

11. A method as in claim 10, further comprising:

producing a graphic representation of said sandblasting pattern according to said impact frequency matrix; and modifying said impact frequency matrix when said graphic representation deviates from said appearance of said pattern.

12. A method as in claim 11, wherein said modifying is achieved by changing said pseudo-random numbers.

13. A method as in claim 11, wherein said modifying is achieved by changing said probability density matrix.

14. A method as in claim 10, further comprising controlling a first laser to mark said pattern on a material by using said laser control codes.

15. A method as in claim 14, further comprising simultaneously controlling a second laser with said laser control codes to mark said material at another location.

16. A computer program, residing on a computer-readable medium, comprising instructions for causing a computer to:

form a probability density matrix indicative of geometry and appearance of a sandblasting pattern;

correlate a set of pseudo-random numbers with said probability density matrix to generate an impact frequency matrix; and generate laser control codes based on said impact frequency matrix.

17. A computer program as in claim 16, further comprising instructions for causing the computer to:

produce a graphic representation of said sandblasting pattern according to said impact frequency matrix; and modify said impact frequency matrix when said graphic representation deviates from said appearance of said pattern.

18. A computer program as in claim 17, wherein said impact frequency matrix is modified by changing said pseudo-random numbers or by changing said probability density matrix.

19. A computer program as in claim 16, further comprising instructions for causing the computer to control a first laser to mark said pattern on a material by using said laser control codes.

20. A computer program as in claim 19, further comprising instructions for causing the computer to simultaneously control a second laser with said laser control codes to mark said material at another location.

* * * * *